(12) United States Patent
Wenren et al.

(10) Patent No.: US 9,784,949 B1
(45) Date of Patent: Oct. 10, 2017

(54) IMAGE PICKUP OPTICAL LENS SYSTEM

(71) Applicant: Zhejiang Sunny Optics Co., Ltd., Ningbo, Zhejiang (CN)

(72) Inventors: Jianke Wenren, Ningbo (CN); Fujian Dai, Ningbo (CN)

(73) Assignee: Zhejiang Sunny Optics Co., Ltd., Ningbo, Zhejiang (CN)

( * ) Notice: Subject to any disclaimer, the term of this patent is extended or adjusted under 35 U.S.C. 154(b) by 0 days.

(21) Appl. No.: 15/253,825

(22) Filed: Aug. 31, 2016

(51) Int. Cl.
*G02B 9/60* (2006.01)
*G02B 13/00* (2006.01)
*G02B 5/20* (2006.01)

(52) U.S. Cl.
CPC ............ *G02B 13/0045* (2013.01); *G02B 9/60* (2013.01); *G02B 5/208* (2013.01)

(58) Field of Classification Search
CPC ........ G02B 13/0045; G02B 9/60; G02B 5/208
See application file for complete search history.

(56) References Cited

U.S. PATENT DOCUMENTS

| | | | |
|---|---|---|---|
| 6,449,433 B2 | 9/2002 | Hagimori et al. | |
| 6,462,886 B1 | 10/2002 | Hagimori | |
| 7,215,477 B2 | 5/2007 | Yamasaki et al. | |
| 7,502,181 B2 | 3/2009 | Shinohara | |
| 7,643,225 B1 | 1/2010 | Tsai | |
| 7,826,151 B2 | 11/2010 | Tsai | |
| 7,911,711 B1 | 3/2011 | Tang et al. | |
| 8,072,695 B1 | 12/2011 | Lee et al. | |
| 8,179,613 B2 | 5/2012 | Sano | |
| 8,310,768 B2 | 11/2012 | Lin et al. | |
| 8,325,429 B2 | 12/2012 | Tang et al. | |
| 8,339,712 B2 | 12/2012 | Hayakawa | |
| 8,724,005 B2 | 5/2014 | Sano | |
| 8,767,316 B2 | 7/2014 | Chang et al. | |

(Continued)

FOREIGN PATENT DOCUMENTS

| JP | 2009042011 | 9/2010 |
|---|---|---|
| JP | 2010224521 | 6/2011 |

(Continued)

*Primary Examiner* — Joseph P Martinez
(74) *Attorney, Agent, or Firm* — Raymond Y. Chan; David and Raymond Patent Firm

(57) ABSTRACT

The optical lens system for forming a subject image on a photoelectric conversion section of a solid image pickup element and an image pickup lens includes, in order from an object side to an image side, a first lens, a second lens, a third lens, a fourth lens, and a fifth lens. The first lens has a positive refractive power and a convex surface on an object side thereof. The second lens has a negative refractive power with a concave surface on an image side thereof. The third lens has a refractive power with an aspheric surface on an object side thereof and a convex surface on an image side thereof. The fourth lens has a positive refractive power with a flat surface on an object side thereof and a convex surface on an image side thereof. The fifth lens has a negative refractive power with aspheric surfaces on an object side and an image side thereof respectively, wherein the fifth lens has at least one inflection point formed at at least one of the aspheric surfaces of the object side and the image side. An aperture stop is disposed at the object side of the first lens and at least one flat element is located between the fifth lens and an image plane.

20 Claims, 23 Drawing Sheets

(56) References Cited

U.S. PATENT DOCUMENTS

| | | | |
|---|---|---|---|
| 8,773,767 B2* | 7/2014 | Chang | G02B 9/60 359/714 |
| 8,810,922 B2 | 8/2014 | Engelhardt et al. | |
| 8,913,330 B1 | 12/2014 | Chang et al. | |
| 8,976,463 B1 | 3/2015 | Chang et al. | |
| 2010/0214467 A1 | 8/2010 | Ohrsu | |
| 2010/0253829 A1 | 10/2010 | Shinohara | |
| 2011/0310494 A1 | 12/2011 | Ise et al. | |

FOREIGN PATENT DOCUMENTS

| JP | 2012073642 | 12/2012 |
|---|---|---|
| JP | 2011197254 | 3/2013 |

* cited by examiner

A

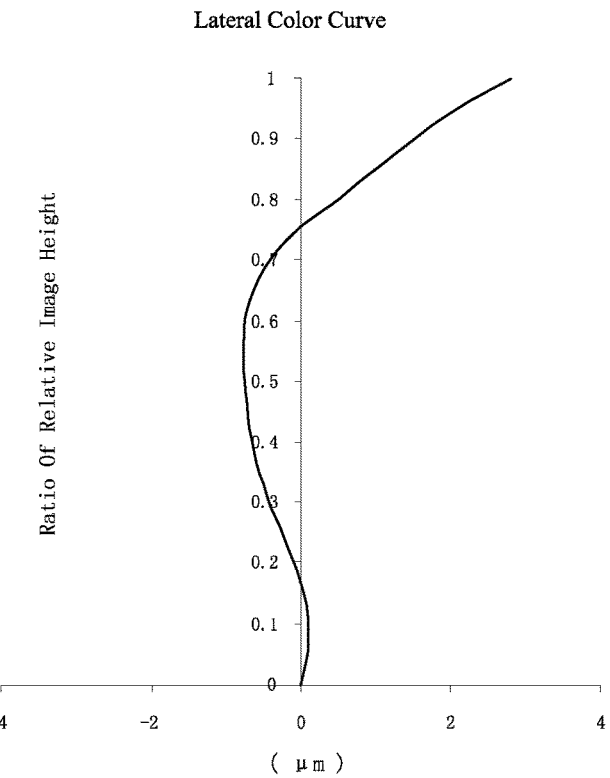

FIG.10

TABLE 1

| Surface # | Surface Type | Curvature Radius | Thickness | Refractive Index /Abbe. # | Conic coefficient |
|---|---|---|---|---|---|
| OBJ | Spherical | Infinity | Infinity | | |
| 70A | Spherical | Infinity | 0.2789 | | |
| 101A | Aspherical | 1.2673 | 0.5707 | 1.54, 56.1 | -0.9245 |
| 102A | Aspherical | 14.3223 | 0.0820 | | -66.9735 |
| 201A | Aspherical | -10.4464 | 0.2300 | 1.65, 21.5 | 49.9932 |
| 202A | Aspherical | 5.7443 | 0.2749 | | -27.0595 |
| 301A | Aspherical | -664.5788 | 0.3406 | 1.64, 23.5 | -99.0000 |
| 302A | Aspherical | -2013.7165 | 0.4891 | | 0.0000 |
| 401A | Aspherical | Infinity | 0.5488 | 1.54, 56.1 | 12.0449 |
| 402A | Aspherical | -1.7439 | 0.1190 | | -1.6795 |
| 501A | Aspherical | 2.9602 | 0.3500 | 1.53, 55.8 | -99.0000 |
| 502A | Aspherical | 0.8507 | 0.4305 | | -6.0259 |
| 601A | Spherical | Infinity | 0.1100 | 1.52, 64.2 | |
| 602A | Spherical | Infinity | 0.4000 | | |
| 901A | Spherical | Infinity | | | |

FIG.11

TABLE 2

| Surface # | A4 | A6 | A8 | A10 | A12 | A14 | A16 | A18 | A20 |
|---|---|---|---|---|---|---|---|---|---|
| 101A | 4.5238E-02 | -8.4051E-03 | 1.0993E-01 | -6.5928E-01 | 1.4428E+00 | -1.6851E+00 | 6.9606E-01 | 0 | 0 |
| 102A | -1.2112E-01 | 1.0496E-01 | 1.0745E-01 | -7.4634E-01 | 1.1025E+00 | -7.9648E-01 | 2.4536E-01 | 0 | 0 |
| 201A | -4.7221E-02 | 3.9533E-01 | 5.5078E-02 | -1.6098E+00 | 3.5282E+00 | -3.1983E+00 | 1.2049E+00 | 0 | 0 |
| 202A | 2.0626E-02 | 5.9639E-01 | -1.4081E+00 | 3.9377E+00 | -7.2810E+00 | 7.6094E+00 | -2.6639E+00 | 0 | 0 |
| 301A | 2.9999E-01 | 3.6942E-01 | 3.0184E+00 | 1.7027E+01 | 5.7900E+01 | 1.1739E+02 | 1.3767E+02 | 8.5402E+01 | 2.1613E+01 |
| 302A | -2.1679E-01 | 1.3408E-01 | -6.2608E-01 | 2.5362E+00 | -6.0905E+00 | 9.0703E+00 | -8.0462E+00 | 3.9741E+00 | -8.5152E-01 |
| 401A | 1.1639E-01 | -4.9534E-01 | 1.1971E+00 | -2.1956E+00 | 2.6512E+00 | -2.0637E+00 | 9.7197E-01 | -2.4715E-01 | 2.5838E-02 |
| 402A | 1.5248E-01 | -2.5237E-01 | 3.1462E-01 | -1.9343E-01 | 2.0463E-02 | 3.6077E-02 | -1.9517E-02 | 4.0455E-03 | -3.1053E-04 |
| 501A | -5.2418E-01 | 3.2248E-01 | -7.0429E-03 | -7.8365E-02 | 4.3410E-02 | -1.1869E-02 | 1.8385E-03 | -1.5367E-04 | 5.3633E-06 |
| 502A | 2.9270E-01 | 2.6792E-01 | 1.8173E-01 | 8.8552E-02 | 3.0599E-02 | 7.1731E-03 | 1.0687E-03 | 9.0672E-05 | 3.3245E-06 |

TABLE 2

| Surface # | A4 | A6 | A8 | A10 | A12 | A14 | A16 | A18 | A20 |
|---|---|---|---|---|---|---|---|---|---|
| 101A | 4.5238E-02 | -8.4051E-03 | 1.0993E-01 | -6.5928E-01 | 1.4428E+00 | -1.6851E+00 | 6.9606E-01 | 0 | 0 |
| 102A | -1.2112E-01 | 1.0496E-01 | 1.0745E-01 | 7.4634E-01 | 1.1025+00 | -7.9648E-01 | 2.4536E-C1 | 0 | 0 |
| 201A | -4.7221E-02 | 3.9533E-01 | 5.5078E-02 | -1.6098E+00 | 3.5282E+00 | -3.1983E+00 | 1.2049E+00 | 0 | 0 |
| 202A | 2.0626E-02 | 5.9639E-01 | -1.4081E+00 | 3.9377E+00 | -7.2810E+00 | 7.6094E+00 | -2.6639E+00 | 0 | 0 |
| 301A | 2.9999E 01 | 3.5942E 01 | 3.0184E+00 | 1.7027E+01 | 5.7900E+01 | 1.1739E+02 | 1.3767E+02 | 8.5402E+01 | 2.1613E+01 |
| 302A | -2.1679E-01 | 1.3468E-01 | -6.2608E-01 | 2.5362E+00 | -6.0905E+00 | 9.0703E+00 | -8.0462E+00 | 3.9711E+00 | -8.5152E-01 |
| 401A | 1.1639E-01 | -4.9534E-01 | 1.1971E+00 | -2.1956E+00 | 2.6512E+00 | -2.0637E+00 | 9.7197E-01 | -2.4715E-01 | 2.5838E-02 |
| 402A | 1.5248E-01 | -2.5237E-01 | 3.1462E-01 | -1.9343E-01 | 2.0463E-02 | 3.6077E-02 | -1.9517E-02 | 4.0455E-03 | -3.1053E-04 |
| 501A | -5.2418E-01 | 3.2248E-01 | -7.0429E-03 | -7.8365E-02 | 4.3410E-02 | -1.1869E-02 | 1.8385E-03 | -1.5367E-04 | 5.3633E-06 |
| 502A | 2.9270E 01 | 2.5792E 01 | 1.8173E 01 | 8.8552E 02 | 3.0599E 02 | 7.1731E 03 | 1.0687E 03 | 9.0672E 05 | 3.3245 06 |

TABLE 3

| Surface # | Surface Type | Curvature Radius | Thickness | Refractive Index /Abbe. # | Conic coefficient |
|---|---|---|---|---|---|
| OBJ | Spherical | Aspherical | Aspherical | | |
| 70B | Spherical | Aspherical | -0.3288 | | |
| 101B | Aspherical | 1.4404 | 0.7526 | 1.54, 56.1 | -9.8430 |
| 102B | Aspherical | 31.4296 | 0.0287 | | -2.8750 |
| 201B | Aspherical | 10.6175 | 0.2503 | 1.64, 23.5 | -25.8220 |
| 202B | Aspherical | 2.7503 | 0.3696 | | -35.0501 |
| 301B | Aspherical | -14.2784 | 0.3944 | 1.64, 23.5 | -3.1323 |
| 302B | Aspherical | -125.6653 | 0.2987 | | -4.5889 |
| 401B | Aspherical | Aspherical | 0.7714 | 1.54, 56.1 | 7.2329 |
| 402B | Aspherical | 1.5020 | 0.2858 | | 2.5267 |
| 501B | Aspherical | -16.6778 | 0.3920 | 1.53, 55.8 | 53.0819 |
| 502B | Aspherical | 1.2796 | 0.3390 | | -7.9774 |
| 601B | Spherical | Infinity | 0.1100 | 1.52, 64.2 | |
| 602B | Spherical | Infinity | 0.4070 | | |
| 901B | Spherical | Infinity | | | |

FIG.18

TABLE 4

| Surface # | A4 | A6 | A8 | A10 | A12 | A14 | A16 |
|---|---|---|---|---|---|---|---|
| 101B | 4.0430E-01 | 7.0944E-01 | 1.4139E+00 | 2.1636E+00 | 2.1532E+00 | 1.2086E+00 | 2.7331E-01 |
| 102B | -3.7117E-01 | 1.2561E+00 | -2.1815E+00 | 2.0622E+00 | -1.1852E+00 | 3.9615E-01 | -5.7680E-02 |
| 201B | 4.3490E-01 | 1.6062E+00 | 2.8734E+00 | 3.0134E+00 | 1.8618E+00 | 5.5740E-01 | 6.4300E-03 |
| 202B | 5.0853E-02 | 3.6615E-01 | -1.1836E+00 | 3.1233E+00 | -5.0313E+00 | 4.4160E+00 | -1.5197E+00 |
| 301B | -2.1875E-01 | -8.0197E-02 | 7.1835E-01 | -1.7826E+00 | 2.4835E+00 | -1.7322E+00 | 4.5228E-01 |
| 302B | -1.8115E-01 | -4.2964E-02 | 3.3257E-01 | -5.0765E-01 | 4.8536E-01 | -2.3848E-01 | 4.6269E-02 |
| 401B | 1.7433E-02 | 1.1798E-01 | 1.5367E-01 | 7.2858E-02 | 1.0503E-02 | 1.5135E-03 | 3.8391E-04 |
| 402B | 7.9089E-02 | -1.2886E-01 | 1.1271E-01 | -3.6657E-02 | 1.2830E-03 | 1.5320E-03 | -2.2758E-04 |
| 501B | -3.0427E-01 | 2.3867E-01 | -1.1545E-01 | 4.1757E-02 | -9.9870E-03 | 1.3347E-03 | -7.4510E-05 |
| 502B | -1.5865E-01 | 1.1036E-01 | -5.2798E-02 | 1.6072E-02 | -3.0182E-03 | 3.1535E-04 | -1.3795E-05 |

FIG.19

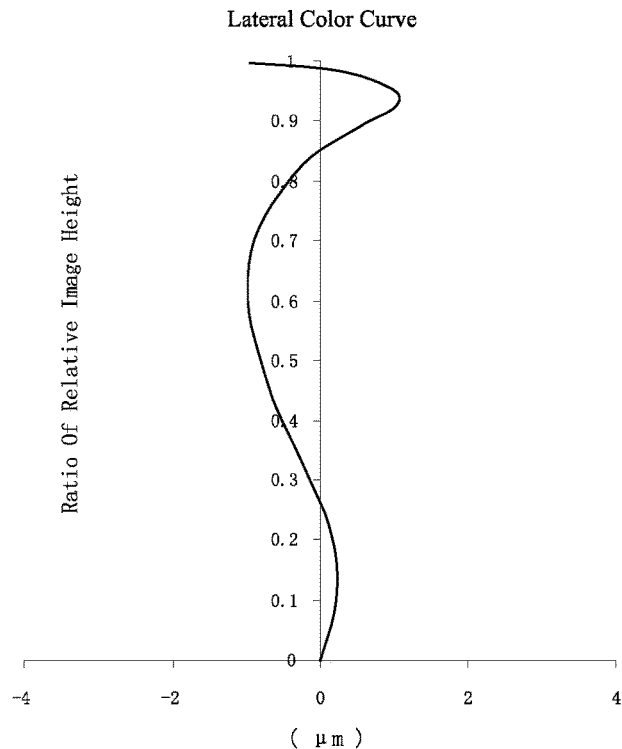

FIG.24

TABLE 5

| Surface # | Surface Type | Curvature Radius | Thickness | Refractive Index /Abbe. # | Conic coefficient |
|---|---|---|---|---|---|
| OBJ | Spherical | Infinity | Infinity | | |
| 70C | Spherical | Infinity | 0.2852 | | |
| 101C | Aspherical | 1.5043 | 0.6317 | 1.54, 56.1 | 9.8426 |
| 102C | Aspherical | 405.5125 | 0.0250 | | -2.8750 |
| 201C | Aspherical | 9.0448 | 0.2391 | 1.64, 23.5 | -25.8220 |
| 202C | Aspherical | 2.4489 | 0.4639 | | -35.0501 |
| 301C | Aspherical | -99.3232 | 0.4217 | 1.54, 56.1 | -3.1323 |
| 302C | Aspherical | -100.0000 | 0.2959 | | -4.5889 |
| 401C | Aspherical | Infinity | 0.7700 | 1.54, 56.1 | 7.2329 |
| 402C | Aspherical | -1.4287 | 0.2811 | | -9.4782 |
| 501C | Aspherical | -16.1853 | 0.3920 | 1.53, 55.8 | 53.0819 |
| 502C | Aspherical | 1.2113 | 0.3621 | | -6.5324 |
| 601C | Spherical | Infinity | 0.1100 | 1.52, 64.2 | |
| 602C | Spherical | Infinity | 0.4875 | | |
| 901C | Spherical | Infinity | | | |

FIG.25

TABLE 6

| Surface # | A4 | A6 | A8 | A10 | A12 | A14 | A16 |
|---|---|---|---|---|---|---|---|
| 101C | 3.6663E-01 | -6.4666E-01 | 1.3740E+00 | -2.3178E+00 | 2.5410E-00 | -1.5640E+00 | 3.8578E-01 |
| 102C | -3.5289E-01 | 1.1688E-00 | -1.9471E+00 | 1.7455E+00 | -8.8632E-01 | 2.2235E-01 | -2.8083E-02 |
| 201C | -4.1785E-01 | 1.3671E-00 | -1.9415E+00 | 1.0883E+00 | 4.1314E-01 | -7.8961E-01 | 2.6529E-01 |
| 202C | 1.6813E-01 | -2.3000E-01 | 9.8753E-01 | -1.9312E+00 | 1.9213E-00 | -6.1226E-01 | -9.4356E-02 |
| 301C | -1.6184E-01 | -8.0091E-02 | 4.4308E-02 | 6.5289E-01 | -1.8027E+00 | 1.9770E+00 | -7.2832E-01 |
| 302C | 1.4915E 01 | 1.2779E 01 | 7.2119E 03 | 4.7351E 01 | 7.7667E 01 | 5.4262E 01 | 1.3024E 01 |
| 401C | 3.8674E 02 | 1.7354E 01 | 4.0425E 02 | 5.1968E 02 | 3.2328E 02 | 5.9782E 03 | 2.1931E 04 |
| 402C | 6.4622E 02 | 1.3574E 01 | 2.3896E 01 | 2.0290E 01 | 8.4369E 02 | 1.7126E 02 | 1.3758E 03 |
| 501C | 1.6472E 01 | 4.8344E 03 | 5.4085E 02 | 1.9793E 02 | 2.4091E 03 | 1.8108E 05 | 1.6858E 05 |
| 502C | -1.3625E-01 | 6.7300E-02 | -2.4387E-02 | 6.0583E-03 | -1 0088E-03 | 1.0083E-04 | -4.4213E-06 |

TABLE 6

| Surface # | A4 | A6 | A8 | A10 | A12 | A14 | A16 |
|---|---|---|---|---|---|---|---|
| 101C | 3.6663E-01 | -6.4666E-01 | 1.3740E+00 | -2.3178E+00 | 2.5410E-00 | -1.5640E+00 | 3.8578E-01 |
| 102C | -3.5289E-01 | 1.1688E-00 | -1.9471E+00 | 1.7455E+00 | -8.8632E-01 | 2.2235E-01 | -2.8083E-02 |
| 201C | -4.1785E-01 | 1.3671E-00 | -1.9415E+00 | 1.0883E+00 | 4.1314E-01 | -7.8961E-01 | 2.6529E-01 |
| 202C | 1.6813E-01 | -2.3000E-01 | 9.8753E-01 | -1.9312E+00 | 1.9213E-00 | -6.1226E-01 | -9.4356E-02 |
| 301C | -1.6184E-01 | -8.0091E-02 | 4.4308E-02 | 6.5289E-01 | -1.8027E+00 | 1.9770E+00 | -7.2832E-01 |
| 302C | 1.4915E 01 | 1.2779E 01 | 7.2119E 03 | 4.7351E 01 | 7.7667E 01 | 5.4262E 01 | 1.3024E 01 |
| 401C | 3.8674E 02 | 1.7354E 01 | 4.0425E 02 | 5.1968E 02 | 3.2328E 02 | 5.9782E 03 | 2.1931E 04 |
| 402C | 6.4622E 02 | 1.3574E 01 | 2.3896E 01 | 2.0290E 01 | 8.4369E 02 | 1.7126E 02 | 1.3758E 03 |
| 501C | 1.6472E 01 | 4.8344E 03 | 5.4085E 02 | 1.9793E 02 | 2.4091E 03 | 1.8108E 05 | 1.6858E 05 |
| 502C | -1.3625E-01 | 6.7300E-02 | -2.4387E-02 | 6.0583E-03 | -1.0088E-03 | 1.0083E-04 | -4.4213E-06 |

FIG.26

TABLE 7

| Surface # | Surface Type | Curvature Radius | Thickness | Refractive Index /Abbe. # | Conic coefficient |
|---|---|---|---|---|---|
| OBJ | Spherical | Infinity | Infinity | | |
| 70D | Spherical | Infinity | -0.2969 | | |
| 101D | Aspherical | 1.5266 | 0.6086 | 1.54, 56.1 | -0.3892 |
| 102D | Aspherical | 12.4436 | 0.0353 | | -42.1735 |
| 201D | Aspherical | 4.5577 | 0.2928 | 1.64, 23.5 | -67.5278 |
| 202D | Aspherical | 2.0585 | 0.3881 | | 2.2646 |
| 301D | Aspherical | 13.5926 | 0.4869 | 1.54, 56.1 | -69.0400 |
| 302D | Aspherical | 37.3056 | 0.3716 | | -0.9254 |
| 401D | Aspherical | Infinity | 0.6268 | 1.54, 56.1 | 3.7944 |
| 402D | Aspherical | 1.4918 | 0.2584 | | 3.2777 |
| 501D | Aspherical | -37.2879 | 0.3920 | 1.53, 55.8 | -80.0000 |
| 502D | Aspherical | 1.2021 | 0.4077 | | -6.8539 |
| 601D | Spherical | Infinity | 0.1100 | 1.52, 64.2 | |
| 602D | Spherical | Infinity | 0.5304 | | |
| 901D | Spherical | Infinity | | | |

FIG.32

TABLE 8

| Surface # | A4 | A6 | A8 | A10 | A12 | A14 | A16 |
|---|---|---|---|---|---|---|---|
| 101D | 2.0331E 02 | 2.4503E 01 | 9.9199E 01 | 2.1878E+00 | 2.7405E 00 | 1.6056E+00 | 5.0352E 01 |
| 102D | -4.8561E-01 | 1.7229E+00 | -3.8706E-00 | 5.9981E+00 | -6.3660E-00 | 4.0008E+00 | -1.1048E+00 |
| 201D | -4.8555E-01 | 1.7989E+00 | -3.8336E-00 | 5.8914E+00 | -6.4901E-00 | 4.4326E+00 | -1.3515E+00 |
| 202D | -2.0397E-01 | 3.8453E-01 | -1.2272E-01 | -6.0559E-01 | 9.7697E-01 | -4.2594E-01 | 0 |
| 301D | -1.9499E-01 | 7.8905E-02 | 4.7653E-01 | -3.7555E+00 | 1.2039E+01 | -2.1086E+01 | 2.0766E+01 |
| 302D | 1.7997E 01 | 1.4891E 01 | 9.0689E 01 | 2.8976E+00 | 5.6394E 00 | 6.8556E+00 | 5.0806E+00 |
| 401D | 2.7829E-02 | -1.8266E-01 | 3.3636E-01 | -5.6128E-01 | 6.2244E-01 | -4.6137E-01 | 2.1324E-01 |
| 402D | 1.1975E-01 | -2.0641E-01 | 3.1098E-01 | -2.9224E-01 | 1.6585E-01 | -5.7151E-02 | 1.1691E-02 |
| 501D | -2.9509E-01 | 2.2683E-01 | -1.0645E-01 | 4.1079E-02 | -1.2459E-02 | 2.6111E-03 | -3.4242E-04 |
| 502D | -1.7751E-01 | 1.4102E-01 | -8.4622E-02 | 3.5355E-02 | -1.0151E-02 | 1.9326E-03 | -2.2968E-04 |

FIG.33

TABLE 8

| Surface # | A4 | A6 | A8 | A10 | A12 | A14 | A16 |
|---|---|---|---|---|---|---|---|
| 101D | 2.0331E 02 | 2.4503E 01 | 9.9199E 01 | 2.1878E+00 | 2.7405E 00 | 1.6056E+00 | 5.0352E 01 |
| 102D | -4.8561E-01 | 1.7229E+00 | -3.8706E-00 | 5.9981E+00 | -6.3660E-00 | 4.0008E+00 | -1.1048E+00 |
| 201D | -4.8555E-01 | 1.7989E+00 | -3.8336E-00 | 5.8914E+00 | -6.4901E-00 | 4.4326E+00 | -1.3515E+00 |
| 202D | -2.0397E-01 | 3.8453E-01 | -1.2272E-01 | -6.0559E-01 | 9.7697E-01 | -4.2594E-01 | 0 |
| 301D | -1.9499E-01 | 7.8905E-02 | 4.7653E-01 | -3.7555E+00 | 1.2039E+01 | -2.1086E+01 | 2.0766E+01 |
| 302D | 1.7997E 01 | 1.4891E 01 | 9.0689E 01 | 2.8976E+00 | 5.6394E 00 | 6.8556E+00 | 5.0806E+00 |
| 401D | 2.7829E-02 | -1.8266E-01 | 3.3636E-01 | -5.6128E-01 | 6.2244E-01 | -4.6137E-01 | 2.1324E-01 |
| 402D | 1.1975E-01 | -2.0641E-01 | 3.1098E-01 | -2.9224E-01 | 1.6585E-01 | -5.7151E-02 | 1.1691E-02 |
| 501D | -2.9509E-01 | 2.2683E-01 | -1.0645E-01 | 4.1079E-02 | -1.2459E-02 | 2.6111E-03 | -3.4242E-04 |
| 502D | -1.7751E-01 | 1.4102E-01 | -8.4622E-02 | 3.5355E-02 | -1.0151E-02 | 1.9326E-03 | -2.2968E-04 |

FIG.33

TABLE 9

| Expression/Example | 1 | 2 | 3 | 4 |
|---|---|---|---|---|
| f/f1 | 1.37 | 1.39 | 1.35 | 1.21 |
| f/f4 | 1.08 | 1.39 | 1.43 | 1.39 |
| f/f5 | -1.46 | -1.74 | -1.79 | -1.75 |
| f4/f5 | -1.35 | -1.25 | -1.25 | -1.26 |
| f/f4-f/f1 | -0.29 | -0.01 | 0.08 | 0.17 |
| \|f/f4\|+\|f/f5\| | 2.53 | 3.13 | 3.21 | 3.14 |
| R1/f | 0.37 | 0.38 | 0.10 | 0.40 |
| R10/f | 0.25 | 0.33 | 0.32 | 0.32 |
| f/R4 | 0.60 | 1.39 | 1.52 | 1.84 |
| \|R1/R2\| | 0.09 | 0.05 | 0.00 | 0.12 |
| R4/R3 | -0.55 | 0.26 | 0.27 | 0.45 |
| R10/R9 | 0.29 | -0.08 | -0.07 | -0.03 |
| (R7-R8)/(R7+R8) | 1.00 | 1.00 | 1.00 | 1.00 |
| (R9+R10)/(R9-R10) | 1.81 | 0.86 | 0.86 | 0.94 |
| (CT2+CT3)/(CT4+CT5) | 0.63 | 0.55 | 0.57 | 0.77 |
| (T12/f)*100 | 2.38 | 0.75 | 0.67 | 0.93 |
| SL/TTL | 0.93 | 0.93 | 0.94 | 0.93 |
| TTL/ImgH | 1.29 | 1.45 | 1.47 | 1.48 |
| Yc1/ImgH | 0.62 | 0.72 | 0.69 | 0.69 |
| Yc2/ImgH | 0.64 | 0.74 | 0.72 | 0.72 |
| Yc52/Td | 0.37 | 0.33 | 0.34 | 0.34 |
| $e^{(VPE/V5)}$ | 3.16 | 3.16 | 3.16 | 3.17 |
| αPE | 7.10 | 7.10 | 7.10 | 7.11 |
| CTPE | 0.11 | 0.11 | 0.11 | 0.12 |
| \|V2-V3\| | 2.01 | 0.00 | 32.60 | 32.60 |
| V1-V2 | 34.58 | 32.60 | 32.60 | 32.60 |

FIG.34

IMAGE PICKUP OPTICAL LENS SYSTEM

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an optical lens system, and more particularly to an image pickup optical lens system applicable to electronic products, such as smart phones, iPads, and notebooks, as mobile device camera.

Description of Related Arts

With the popularity of mobile products with camera functions, compact lens modules are greatly demanded in the smart phone market. While conventional camera generally uses Charge Coupled Device (CCD) or Complementary Metal-Oxide Semiconductor (CMOS) sensors, there is an increasing demand for compact imaging lens apparatus featuring better image quality.

Conventional lens apparatus for electronic device mainly uses four lenses or five lenses system. While the demand of imaging lens apparatus for electronic device, such as smart phone, tablet, notebook, and etc., the conventional four lenses or five lenses system does not meet such requirement and thus high resolution and performance with compact size optical lens apparatus is a need to develop in the market of electronic products nowadays.

Such compact lens systems for smart devices, such as JP2009042011, JP2010224521, JP2011197254, JP2012073642, US2010/0214467, US2010/0253829, US2011/0310494, U.S. Pat. No. 6,449,433, U.S. Pat. No. 6,462,886, U.S. Pat. No. 7,215,477, U.S. Pat. No. 7,502,181, U.S. Pat. No. 7,643,225, U.S. Pat. No. 7,826,151, U.S. Pat. No. 7,911,711, U.S. Pat. No. 8,072,695, U.S. Pat. No. 8,179,613, U.S. Pat. No. 8,310,768, U.S. Pat. No. 8,325,429, U.S. Pat. No. 8,339,712, U.S. Pat. No. 8,724,005, U.S. Pat. No. 8,767,316, U.S. Pat. No. 8,810,922, U.S. Pat. No. 8,913,330, U.S. Pat. No. 8,976,463, and etc., disclosed four or five lens system but they are insufficient for the high resolution and quality needs and expectation for the smart devices.

SUMMARY OF THE PRESENT INVENTION

The invention is advantageous in that it provides an image pickup optical lens system which comprises an optical lens system for forming a subject image on a photoelectric conversion section of a solid image pickup element and an image pickup lens comprising, in order from an object side to an image side, a first lens, a second lens, a third lens, a fourth lens, and a fifth lens, the first lens having a positive refractive power with a convex surface on an object side thereof, the second lens having a negative refractive power with a concave surface on an image side thereof, the third lens having a refractive power with an aspheric surface on an object side thereof and a convex surface on an image side thereof, the fourth lens having a positive refractive power with a flat surface on an object side thereof and a convex surface on an image side thereof, the fifth lens having a negative refractive power with aspheric surfaces on an object side and an image side thereof respectively, wherein the fifth lens has at least an inflection point formed at least one of the aspheric surfaces of the object side and the image side.

In one embodiment, the optical lens system further comprises an aperture stop which is disposed at the object side of the first lens, and at least one flat element which is located between the fifth lens and an image plane; wherein the optical lens system satisfies the following conditional expressions:

$1.20 \leq f/f1 \leq 1.40$ $1.00 \leq f/f4 \leq 1.45$ $-1.80 \leq f/f5 \leq -1.45$ $-1.35 \leq f4/f5 \leq -1.25$ $-0.30 \leq f/f4 - f/f1 \leq 0.10$ $2.50 \leq |f/f4| + |f/f5| \leq 3.25$ $0.90 \leq SL/TTL \leq 0.95$ $1.25 \leq TTL/ImgH \leq 1.50$ $0.60 \leq Yc1/ImgH \leq 0.75$ $0.60 \leq Yc2/ImgH \leq 0.75$ $0.32 \leq Yc52/Td \leq 0.38$ $0 \leq |V2 - V3| \leq 32.6$ $32.58 \leq V1 - V2 \leq 35$ $0 \leq |R1/R2| \leq 0.15$ $-0.55 \leq R4/R3 \leq 0.45$ $-0.10 \leq R10/R9 \leq 0.30$ $0.85 \leq (R9+R10)/(R9-R10) \leq 1.85$ $0.35 \leq R1/f \leq 0.40$ $0.25 \leq R10/f \leq 0.35$ $0.60 \leq f/R4 \leq 1.85$ $0.8 \leq (R7-R8)/(R7+R8) \leq 1.0$ $\alpha PE = 7.1$ $3.13 \leq e^{(VPE/V5)} \leq 3.16$ $CTPE = 0.11$ $0.55 \leq (CT2+CT3)/(CT4+CT5) \leq 0.80$ $0.65 \leq (T12/f)*100 \leq 2.40$ where,
f denotes a focal length of the optical lens system,
f1 denotes a focal length of the first lens,
f4 denotes a focal length of fourth lens,
f5 denotes a focal length of the fifth lens,
TTL denotes a distance of an optical axis between the object side of the first lens and an image plane, ImgH denotes a half of a diagonal length of an effective pixel area of an image sensor, SL denotes a distance of the optical axis between the aperture stop and the image plane, Yc1 denotes a vertical distance from the optical axis to the intersection point of the light and the image side of the fifth lens, when an incident angle of the light is 36° and the light passes through the center of the aperture stop, Yc2 denotes a vertical distance from the optical axis to the intersection point of the light and the image side of the fifth lens, when the incident angle of the light is 37° and the light passes though the center of the aperture stop, Yc52 denotes a distance between the optical axis and a non-axial critical point of the image side of the fifth lens, Td denotes an axial distance between the object side of the first lens and the image side of the fifth lens, V1 denotes the Abbe number of the first lens, V2 denotes the Abbe number of the second lens, V3 denotes the Abbe numbers of the third lens, V5 denotes the Abbe number of the fifth lens, R1 denotes a radius of a curvature of the object side of the first lens, R2 denotes a radius of a curvature of the image side of the first lens, R3 denotes a radius of a curvature of the object side of the second lens, R4 denotes a radius of a curvature of the image side of the second lens, R7 denotes a radius of a curvature of the object side of the fourth lens, R8 denotes a radius of a curvature of the image side of the fourth lens, R9 denotes a radius of a curvature of the object side of the fifth lens, R10 denotes a radius of a curvature of the image side of the fifth lens, αPE denotes a linear expansion coefficient of the flat element at 20° C., VPE denotes a relationship between the Abbe number of the flat element, CTPE denotes a central thickness of the flat element, CT2 denotes a central thickness of the second lens, CT3 denotes a central thickness of the third lens, CT4 denotes a central thickness of the fourth lens, and T12 denotes the on-axis spacing between the first lens and the second lens.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 10 illustrates a lateral color curve of the image pickup optical lens system according to the first example of the preferred embodiment of the present invention.

FIG. 11 is TABLE 1 which lists the optical data of the image pickup optical lens system according to the first example of the preferred embodiment of the present invention.

FIG. 18 is TABLE 3 which lists the optical data of the image pickup optical lens system according to the second example of the preferred embodiment of the present invention.

FIG. 19 is TABLE 4 which lists the aspheric coefficients of the image pickup optical lens system according to the second example of the preferred embodiment of the present invention.

FIG. 24 illustrates a lateral color curve of the image pickup optical lens system according to the third example of the preferred embodiment of the present invention.

FIG. 25 is TABLE 5 which lists the optical data of the image pickup optical lens system according to the third example of the preferred embodiment of the present invention.

FIG. 32 is TABLE 7 which lists the optical data of the image pickup optical lens system according to the fourth example of the preferred embodiment of the present invention.

FIG. 33 is TABLE 8 which lists the aspheric coefficients of the image pickup optical lens system according to the fourth example of the preferred embodiment of the present invention.

FIG. 34 is TABLE 9 which lists the specific values of the conditional expressions of the image pickup optical lens system according to the above four examples of the preferred embodiments of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
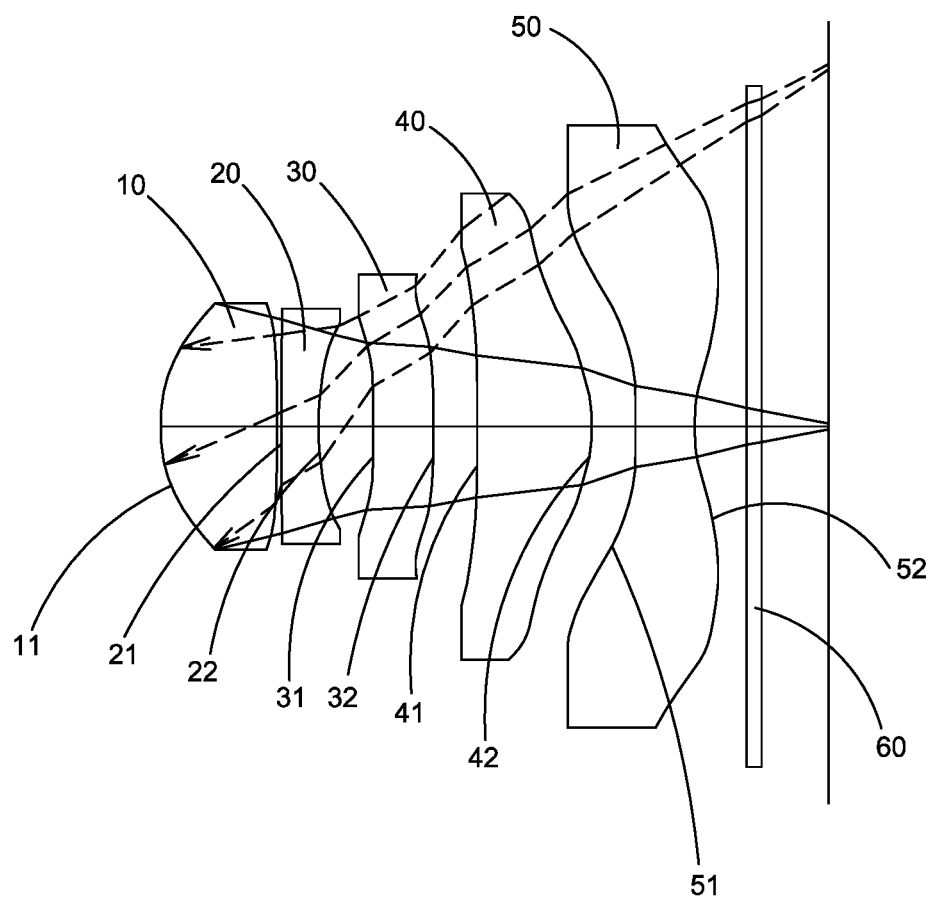
FIG. 1 is a light path diagram of an image pickup optical lens system according to a preferred embodiment of the present invention.
Figure 2:
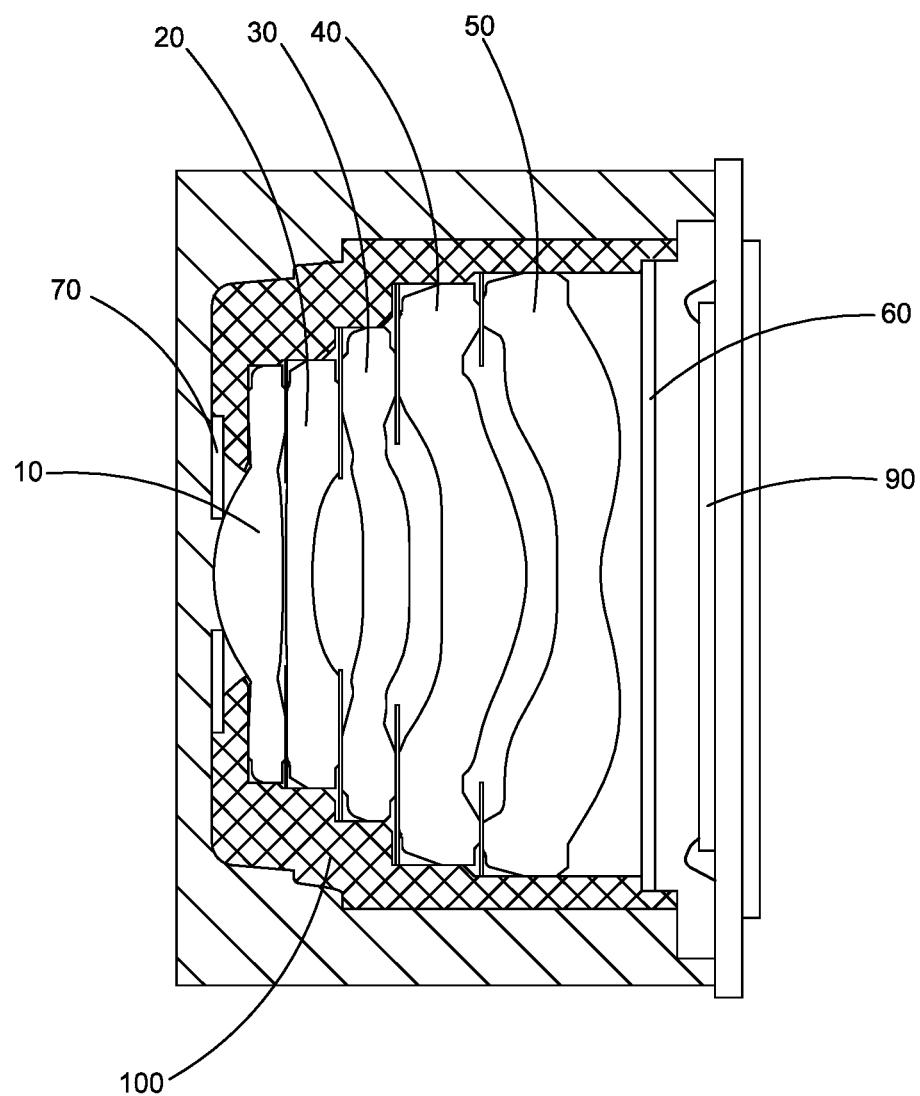
FIG. 2 is a schematic cross sectional view showing outline of an image pickup apparatus equipped with the optical lens system according to the preferred embodiment of the present invention.
Figure 3:
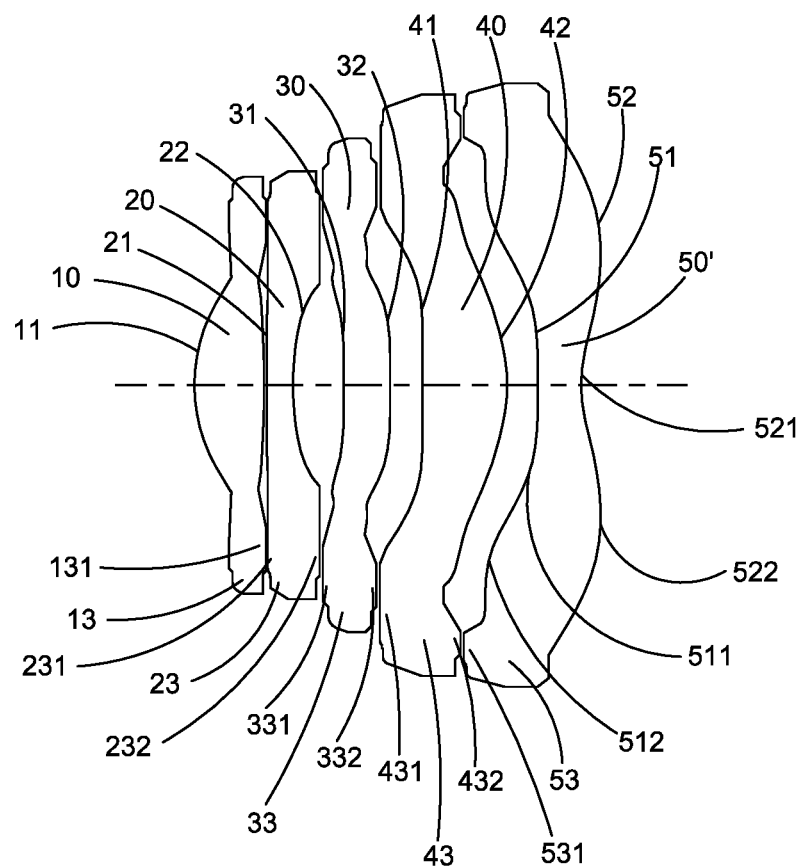
FIG. 3 is a schematic view of the image pickup optical lens system according to the preferred embodiment of the present invention.

In an image pickup optical lens system for forming a subject image on a photoelectric conversion section of the solid image pickup element 90 and the image pickup lens according to a preferred embodiment, as shown in FIGS. 1 and 2, comprises, in order from an object side to an image side, a first lens 10, a second lens 20, a third lens 30, a fourth lens 40, and a fifth lens 50.

The first lens 10 has a positive refractive power with a convex surface on its object side 11.

The second lens 20 has a negative refractive power with a concave surface on its image side 22.

The third lens 30 has a refractive power with aspheric surfaces on both object side 31 and image side 32 thereof respectively. According to the preferred embodiment, the image side 32 has a convex surface.

The fourth lens 40 has a positive refractive power with a flat surface on its object side 41 and a convex surface on its image side 42.

The fifth lens 50 has a negative refractive power with at least an inflection point formed on the surface of at least one of its object side 51 and image side 52 and at least one of the surfaces of its object side 51 and image side 52 is aspheric. According to the preferred embodiment, the image side 52 has a concave surface.

According to the preferred embodiment of the present invention, the optical lens system further comprises an aperture stop 70 located at the object side of the first lens 10, and at least one flat element 60 located between the fifth lens 50 and an image plane. The fifth lens 50 is embodied to be made of plastic material. The fifth lens 50 has at least one inflection point formed at at least one of the aspheric surfaces of the object side 51 and the image side 52 thereof. The flat element 60 can be embodied as an IR filter.

According to the preferred embodiment of the present invention, a distance of the optical axis between object side 11 of the first lens 10 and the image plane is TTL and a half of a diagonal length of an effective pixel area of the image sensor of the optical lens system of the present invention is ImgH, and the relationship between the TTL and ImgH is:

$1.25 \leq TTL/ImgH \leq 1.50.$

A focal length of the optical lens system is f, wherein f1 is a focal length of the first lens 10, f4 is a focal length of fourth lens 40, and f5 is a focal length of the fifth lens 50, which satisfy the following relationships:

$1.20 \leq f/f1 \leq 1.40;$ $1.00 \leq f/f4 \leq 1.45;$ $-1.80 \leq f/f5 \leq -1.45;$ $-1.35 \leq f4/f5 \leq -1.25;$ $-0.30 \leq f/f4 - f/f1 \leq 0.10;$ and $2.50 \leq |f/f4| + |f/f5| \leq 3.25.$ SL is a distance of the optical axis between the aperture stop 70 and the image plane and Yc1 is the vertical distance from the optical axis to the intersection point of the light and the image side 52 of the fifth lens 50 while an incident angle of the light is 36° and the light passes through a center of the aperture stop 70.

The relationship between the SL and the TTL is $0.90 \leq SL/TTL \leq 0.95$.

The relationship between the Yc1 and the ImgH is $0.60 \leq Yc1/ImgH \leq 0.75$.

A vertical distance from the optical axis to the intersection point of the light and the image side 52 of the fifth lens 50 is Yc2 while an incident angle of the light is 37° and the light passes through a center of the aperture stop 70, where the relationship between the Yc2 and the ImgH is:

$0.60 \leq Yc2/ImgH \leq 0.75.$

The Abbe numbers of the first lens 10, second lens 20 and the third lens 30 are V1, V2 and V3 respectively, which satisfy the following relationships:

$0 \leq |V2-V3| \leq 32.6;$ and $32.58 \leq V1-V2 \leq 35.$

R1 is the radius of the curvature of the object side 11 of the first lens 10 and R2 is the radius of the curvature of the image side 12 of the first lens 10. R3 is the radius of the curvature of the object side 21 of the second lens 20 and R4 is the radius of the curvature of the image side 22 of the second lens 20. R7 is the radius of the curvature of the object side 41 of the fourth lens 40 and R8 is the radius of the curvature of the image side 42 of the fourth lens 40. R9 is the radius of the curvature of the object side 51 of the fifth lens 50 and R10 is the radius of the curvature of the image side 52 of the fifth lens 50. The optical lens system of the present invention satisfies the following relationships:

$$0 \le |R1/R2| \le 0.15;$$

$$-0.55 \le R4/R3 \le 0.45;$$

$$-0.10 \le R10/R9 \le 0.30;$$

$$0.85 \le (R9+R10)/(R9-R10) \le 1.85;$$

$$0.35 \le R1/f \le 0.40;$$

$$0.25 \le R10/f \le 0.35;$$

$$0.60 \le f/R4 \le 1.85; \text{ and}$$

$$0.8 \le (R7-R8)/(R7+R8) \le 1.0.$$

A distance between the optical axis and a non-axial critical point of the image side 52 of the fifth lens 50 is Yc52, and an axial distance between the object side 11 of the first lens 10 and the image side 52 of the fifth lens 50 is Td, wherein the relationship between the Yc52 and the Td is:

$$0.32 \le Yc52/Td \le 0.38.$$

A linear expansion coefficient αPE of the flat element is 20° C. is equal to 7.1.

The relationship between the Abbe number of the flat element VPE and the Abbe number V5 of the fifth lens 50 is:

$$3.13 \le e^{(VPE/V5)} \le 3.16.$$

A central thickness of the flat element CTPE is equal 0.11. The central thickness of the second lens 20, the third lens 30, the fourth lens 40, and the fifth lens 50 are CT2, CT3, CT4, and CT5 respectively, which satisfy the following relationship:

$$0.55 \le (CT2+CT3)/(CT4+CT5) \le 0.80.$$

If T12 is the on-axis spacing between the first lens 10 and the second lens 20, then $0.65 \le (T12/f)*100 \le 2.40$.

FIG. 2 is a schematic cross sectional view showing the outline of an image pickup apparatus equipped with the optical lens system of the present invention as shown in FIG. 1 by enclosing within a lens barrel 100, which may be bonded to a substrate mount with a solid pickup element, such as an image sensor, having the photoelectric conversion surface on the object side, wherein external electrode, being connected with control section external to the image pickup apparatus, may be formed on the substrate in such a manner that operation control signals are inputted or outputted.

More specifically, according to this preferred embodiment, as shown in FIGS. 2-5 of the drawings, the image pickup optical lens system further comprises a lens barrel 100 and a plurality of ring shaped separators 80. Accordingly, the lenses 10, 20, 30, 40 and 50 are housed in the lens barrel 100, and a separator is provided between each two adjacent lenses. More specifically, the plurality of separators 80 of this preferred embodiment comprises of a first separator 81 which is laminated between the first lens 10 and the second lens 20, a second separator 82 which is laminated between the second lens 20 and the third lens 30, a third separator 83 which is laminated between the third lens 30 and the fourth lens 40, and a fourth separator 84 which is laminated between the fourth lens 40 and the fifth lens 50.

Accordingly, it is understandable that each of the separators 80 may comprise a light-impermeable and light-absorbing material, and a pore diameter of each of the separators 80 is configured to have a suitable size that allows desired light beams to pass through each of the lenses 10, 20, 30, 40 and 50 while prevents unwanted light beams from reaching to the image plane. As shown in the drawings, in a direction from an object side to an image side, the lens barrel 100 has increasing inner diameters to match with outer diameters of the lenses 10, 20, 30, 40 and 50, and the plurality of separators 80 may be correspondingly constructed to have increasing pore diameters. In addition, light beams reflected on an inner wall of the lens barrel 100 also can be absorbed by the plurality of separators 80. Therefore, the plurality of separators 80 provides an effective light sheltering function. Furthermore, when being made of resilient material, each of the separators 80 sandwiched between two adjacent lenses can provide a cushioning function to the two adjacent lenses for preventing unwanted scratch of the two adjacent lenses.

As shown in the drawings, according to this preferred embodiment of the present invention, each of the lenses 10, 20, 30, 40 and 50 comprises at least one mounting end, i.g. an outer circumferential mounting end or two mounting end provided at two opposite sides of each lens, for mounting each lens in position in the lens barrel 100. In this embodiment, an outer circumferential portion of each lens forms the mounting end. In other words, each lens comprises a central lens body as shown in FIG. 1, and a circumferential portion integrally extended from the central lens body, and the circumferential portion is provided around the central lens body to form the mounting end. Accordingly, the central lens body of each lens is provided for refracting light beams, while the mounting end is biasing against the inner wall of the lens barrel 100 for retaining each lens in the lens barrel 100.

Accordingly, the plurality of separators 80 is respectively stacked with the mounting ends of the lenses 10, 20, 30, 40 and 50 to define an effective optical operation area of the central lens body of each lens. As shown in the drawings, each separator is actually laminated between two mounting ends of two adjacent lenses. In addition, according to this preferred embodiment, each mounting end is provided with upper or lower mounting portions for laminating with the adjacent separator.

More specifically, the lenses 10, 20, 30, 40, and 50 comprise a first mounting end 13, a second mounting end 23, a third mounting end 33, a fourth mounting end 43, and a fifth mounting end 53 circumferentially and integrally extended from the central lens body thereof respectively. As shown in the drawings, The first mounting end 13 comprises a first lower mounting portion 131 at a bottom side thereof, the second mounting end 23 comprises a second upper mounting portion 231 and a second lower mounting portion 232 at a top side and a bottom side thereof respectively, the third mounting end 33 comprises a third upper mounting portion 331 and a third lower mounting portion 332 at a top side and a bottom side thereof respectively, the fourth mounting end 43 comprises a fourth upper mounting portion 431 and a fourth lower mounting portion 432 at a top side and a bottom side thereof respectively, and the fifth mounting end 53 comprises a fifth upper mounting portion 531. Accordingly, it is appreciated that each of the upper and lower mounting portions can be embodied as a protrusion portion for laminating and contacting with the adjacent separator.

Figure 4:
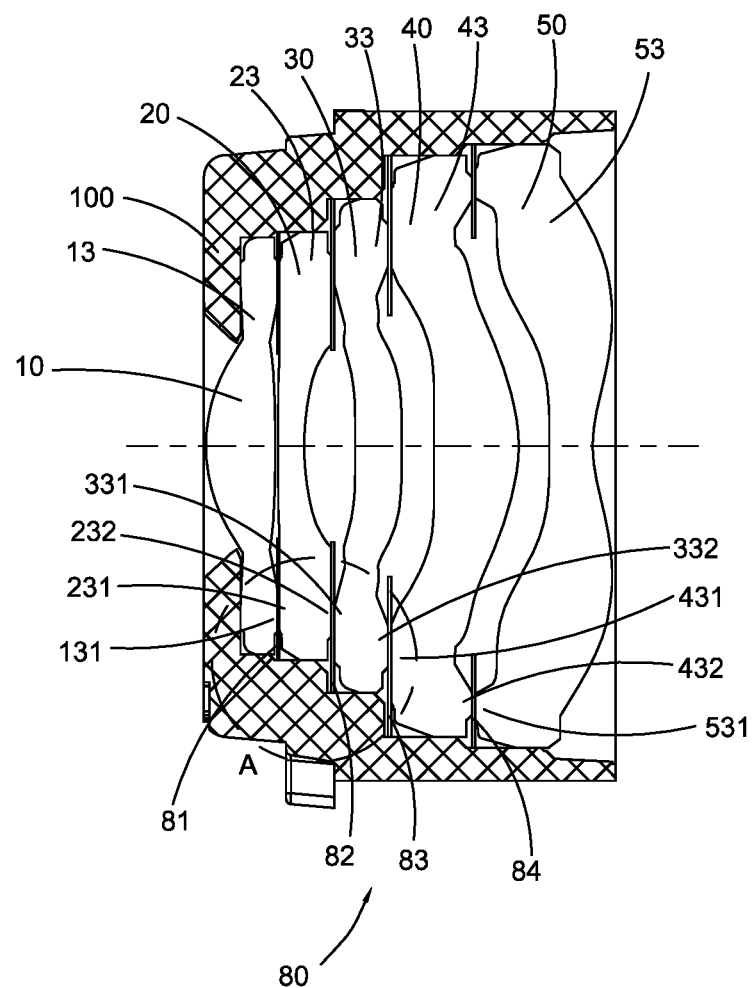
FIG. 4 is a schematic cross sectional view illustrating the optical lens system being assembled with separators according to the preferred embodiment of the present invention.
Figure 5:
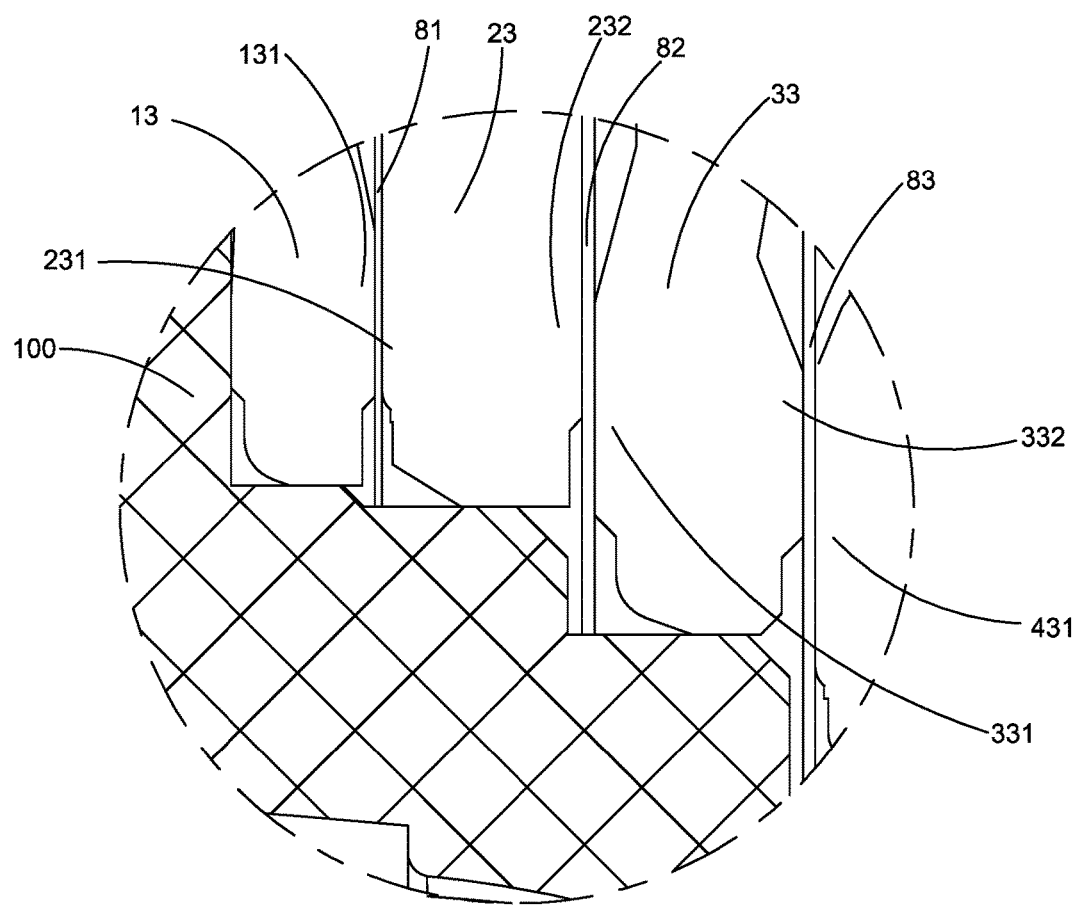
FIG. 5 is a partial enlarged view illustrating a separator laminated between two lenses of the image pickup optical lens system according to the preferred embodiment of the present invention.

Referring to FIGS. 4 and 5 of the drawings, the first lens 10 is laminated and retained between the upper inner wall of the lens barrel 100 and the first separator 81, the second lens 20 is laminated and retained between the first and second separators 81 and 82, the third lens 30 is laminated and retained between the second and third separators 82 and 83, the fourth lens 40 is laminated and retained between the third and fourth separators 83 and 84, and the fifth lens 50 is laminated to the fourth separator 84. Correspondingly, the first separator 81 is laminated between the first lower mounting portion 131 of the first lens 10 and the second upper mounting portion 231 of the second lens 20, the second separator 82 is laminated between the second lower mounting portion 232 of the second lens 20 and the third upper mounting portion 331 of the third lens 30, the third separator 83 is laminated between the third lower mounting portion 332 of the third lens 30 and the fourth upper mounting portion 431 of the fourth lens 40, and the fourth separator 84 is laminated between the fourth lower mounting portion 432 of the fourth lens 40 and the fifth upper mounting portion 531 of the fifth lens 50. Therefore, a compact and stable structure of the image pickup optical lens system is formed.

Referring to FIGS. 4 and 5 of the drawings, at least a part of a lateral surface of each circumferential mounting end of each lens is spaced apart from the inner wall of the lens barrel 100, so as to reduce a contact area between the circumferential mounting end of each lens and the inner wall of the lens barrel 100. According to this preferred embodiment, an upper part of each circumferential mounting end of lens is embodied to have a slope surface to space apart from the inner wall of the lens barrel 100. In other words, the mounting end of each lens has reduced and tapered thickness so as to reduce a frictional contact area between the mounting end and the inner wall of the lens barrel 100, as well as to reduce a frictional contact area between the mounting end and the adjacent separator.

It is worth mentioning that a surface of each of the lenses 10, 20, 30, 40 and 50 has a substantial smooth curvature, so that they are easy for manufacturing and convenient for forming in shape. It is appreciated that air layers between two lens bodies of each two adjacent lenses are as even as possible, so that it is convenient for the assembling process. The configuration of the plurality of separators 80 provides an effective light sheltering and cushioning performance.

According to this preferred embodiment, the structure of the image pickup optical lens system is modified and the values and relationship of the parameters of the image pickup optical lens system are selected so as to fit for the high resolution and quality needs and expectation for the smart devices. A person skilled in the art will understand that the configuration and the specification of the image pickup optical lens system of this embodiment ensure a high resolution performance, enable a comparatively thin shape and a relatively large field of view, and also effectively rectify a lens distortion.

It is still worth mentioning that the fifth lens 50 of this preferred embodiment is embodied to have a configuration which has a central indention shape and is gradually changed to a protrusion shape at an outer peripheral side at both of the object side 51 and the image side 52 thereof. More specifically, the object side 51 of the fifth lens 50 comprises a first central concave portion 511, and a first convex portion 512 circumferentially and integrally extended from the first central concave portion 511, the image side 52 of the fifth lens 50 comprises a second central concave portion 521, and a second convex portion 522 circumferentially and integrally extended from the second central concave portion 521. Accordingly, the convex portions 512 and 522 is respectively extended between the central concave portions 511 and 521 and the mounting end 53 below the fourth separator 84, rendering the shape of the fifth lens 50 gradually changed from an indention to a protrusion at both of the object side 51 and the image side 52 thereof. Such configuration of the fifth lens 50 effectively reduces a light incident angle, enhances an relative illumination performance, obtains an even distributed brightness from the circumferential edge to the center thereof, and thus the image quality of the image pickup optical lens system is achieved.

Figure 6:
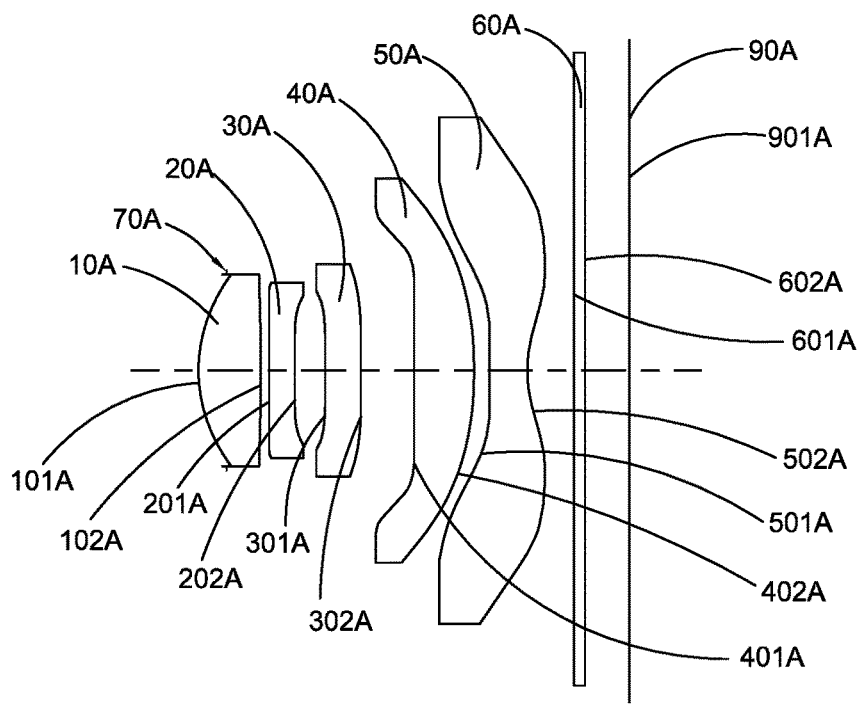
FIG. 6 is a schematic view of the image pickup optical lens system according to a first example of the preferred embodiment of the present invention.
Figure 7:
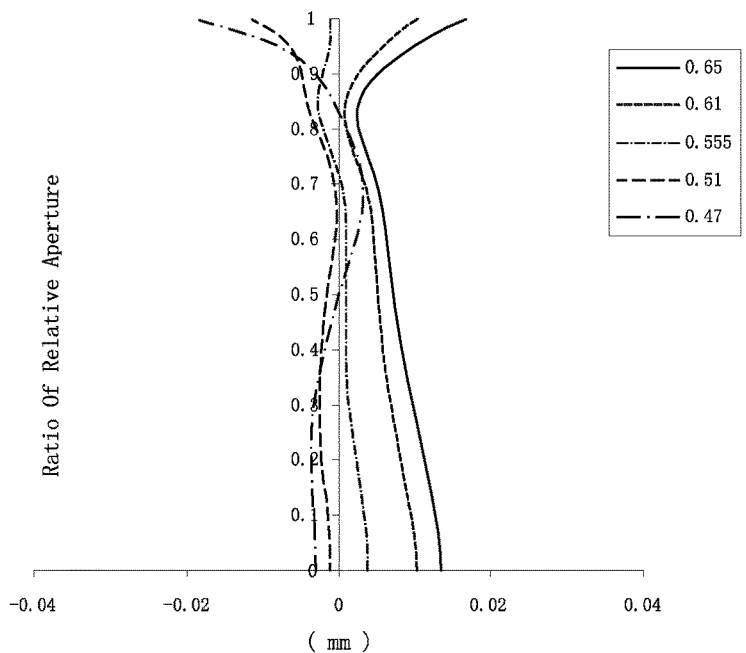
FIG. 7 illustrates longitudinal aberration curves of the image pickup optical lens system according to the first example of the preferred embodiment of the present invention.
Figure 8:
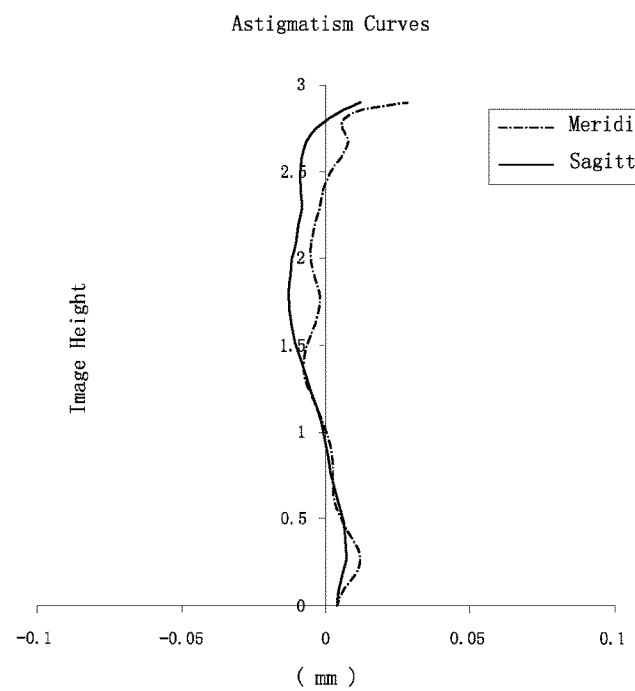
FIG. 8 illustrates astigmatism curves of the image pickup optical lens system according to the first example of the preferred embodiment of the present invention.
Figure 9:
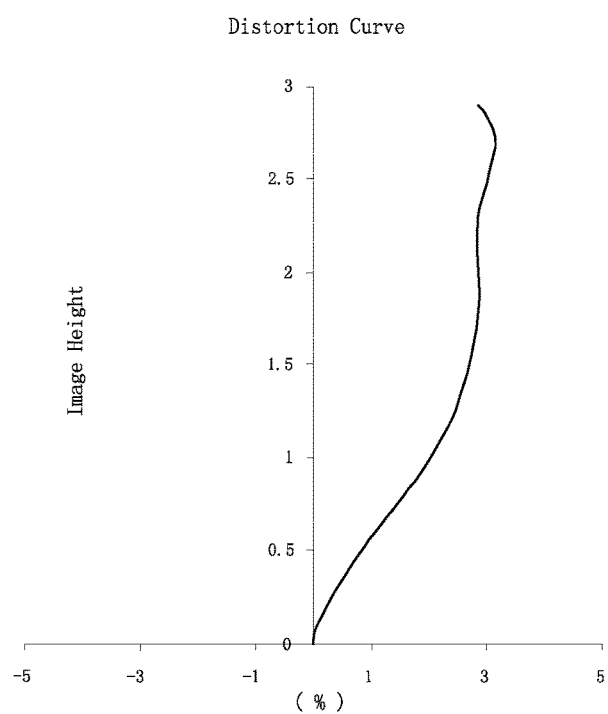
FIG. 9 illustrates a distortion curve of the image pickup optical lens system according to the first example of the preferred embodiment of the present invention.
Figures 12, 13:
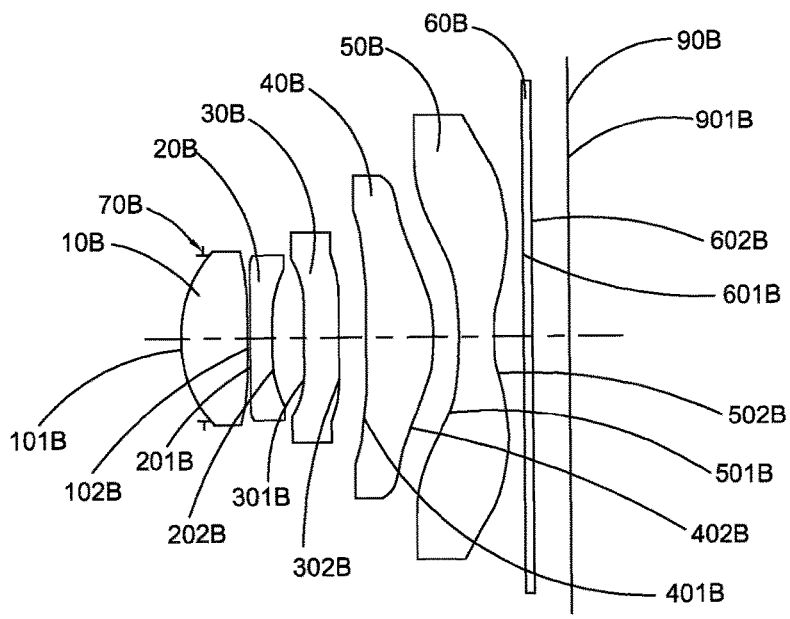
FIG. 12 is TABLE 2 which lists the aspheric coefficients of the image pickup optical lens system according to the first example of the preferred embodiment of the present invention
FIG. 13 is a schematic view of the image pickup optical lens system according to a second example of the preferred embodiment of the present invention.
Figures 12, 13:
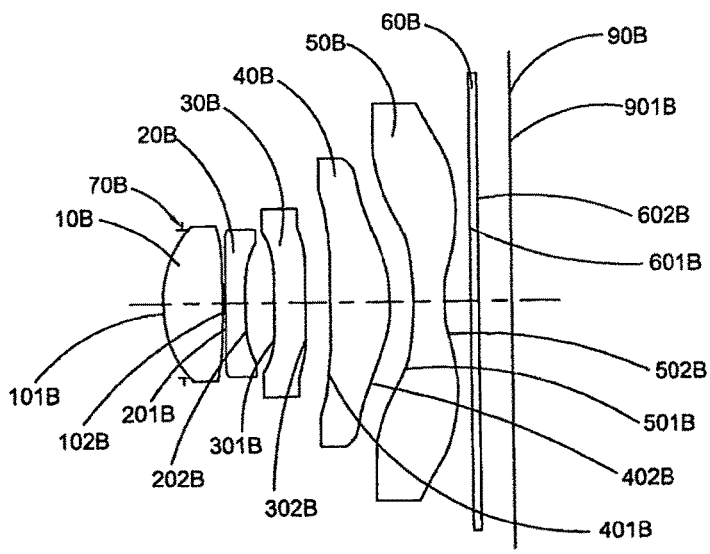
Figure 14:
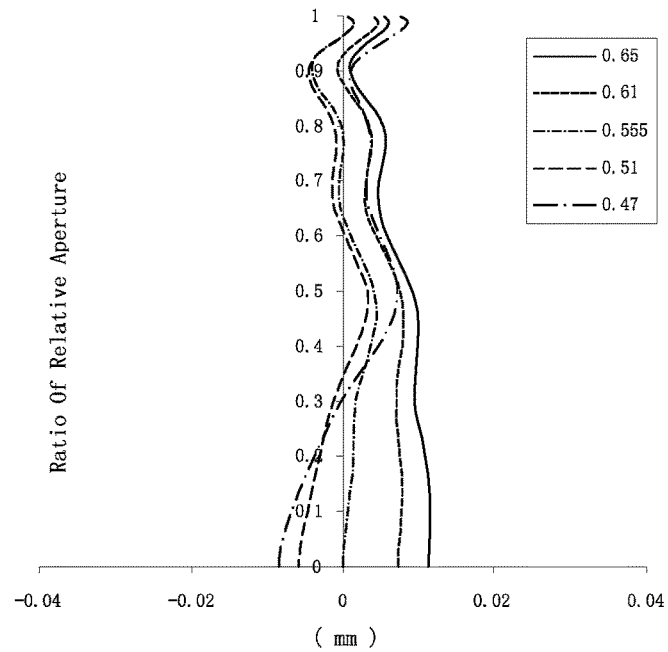
FIG. 14 illustrates longitudinal aberration curves of the image pickup optical lens system according to the second example of the preferred embodiment of the present invention.
Figure 15:
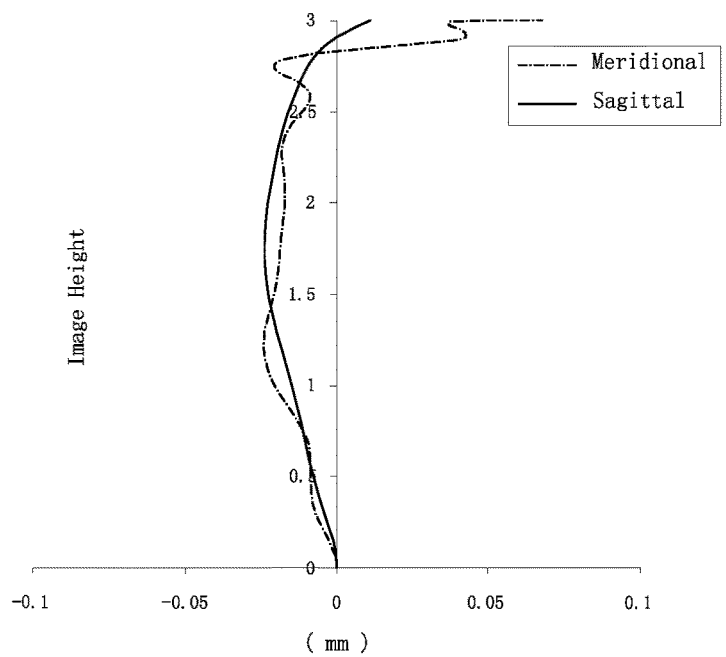
FIG. 15 illustrates astigmatism curves of the image pickup optical lens system according to the second example of the preferred embodiment of the present invention.
Figure 16:
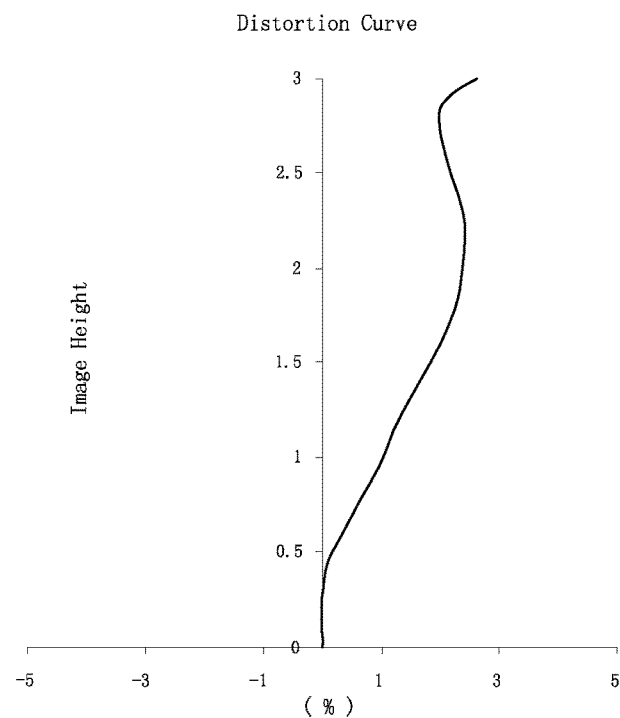
FIG. 16 illustrates a distortion curve of the image pickup optical lens system according to the second example of the preferred embodiment of the present invention.
Figure 17:
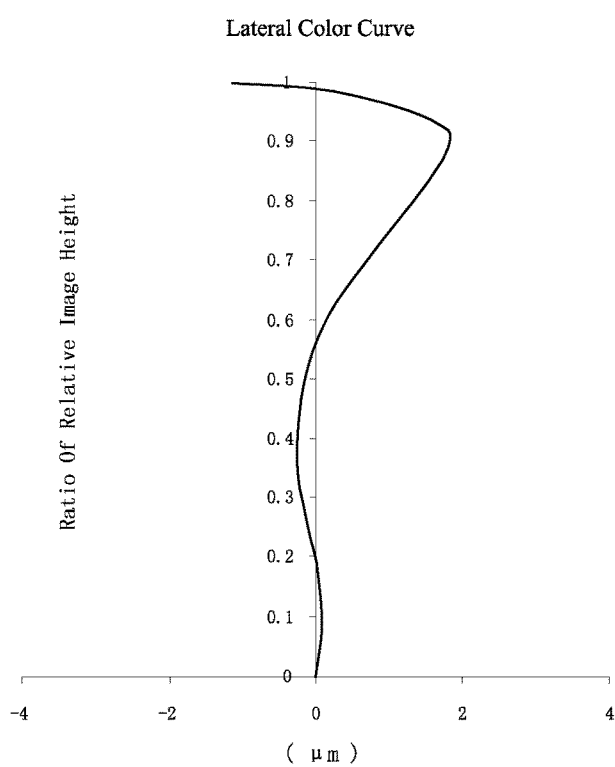
FIG. 17 illustrates a lateral color curve of the image pickup optical lens system according to the second example of the preferred embodiment of the present invention.

Referring to FIGS. 6-12 of the drawings, more specifically, the optical lens system according to the first example of the preferred embodiment of the present invention satisfies the following specific conditional expressions:

$f/f1=1.37$ $f/f4=1.08$ $f/f5=-1.46$ $f/f4-f/f1=-0.29$ $f4/f5=-1.35$ $|f/f4|+|f/f5|=2.53$ $SL/TTL=0.93$ $TTL/ImgH=1.29$ $Yc1/ImgH=0.62$ $Yc2/ImgH=0.64$ $Yc52/Td=0.37$ $|V2-V3|=2.01$ $(V1-V2)=34.58$ $|R1/R2|=0.09$ $R4/R3=-0.55$ $R10/R9=0.29$ $(R9+R10)/(R9-R10)=1.81$ $R1/f=0.37$ $R10/f=0.25$ $f/R4=0.60$ $(R7-R8)/(R7+R8)=1.00$ $\alpha PE=7.10$ $e^{(VPE/V5)}=3.16$ $CTPE=0.11$ $(CT2+CT3)/(CT4+CT5)=0.63$ $(T12/f)*100=2.38.$ In addition, As shown in FIGS. 6 and 11-12, the aperture stop 70A, which is provided between an imaged object and the first lens 10A, has a spherical surface towards the imaged object, the first lens 10A has a first object side surface 101A which is an aspherical surface and a first image side surface 102A which is an aspherical surface, the second lens 20A has a second object side surface 201A which is an aspherical surface and a second image side surface 202A which is an aspherical surface, the third lens 30A has a third object side surface 301A which is an aspherical surface and a third image side surface 302A which is an aspherical surface, the fourth lens 40A has a fourth object side surface 401A which is an aspherical surface and a fourth image side surface 402A which is an aspherical surface, the fifth lens 50A has a fifth object side surface 501A which is an aspherical surface and a fifth image side surface 502A which is an aspherical surface, the flat element 60A, which can be an IR filter, has a flat element object side surface 601A and a flat element image side surface 602A, and the solid image pickup element 90A defines an image plane 901A. The optical data of the image pickup optical lens system according to the first example of the preferred embodiment of the present invention is shown in FIG. 11.

FIG. 12 illustrates the aspheric coefficients of the surfaces of the five lenses 10A-50A. FIGS. 7 to 10 illustrate longitudinal aberration curves, astigmatism curves, a distortion curve, and a lateral color curve of the image pickup optical lens system according to the first example of the preferred embodiment respectively.

Referring to FIGS. 13-19 of the drawings, the optical lens system according to a second example of the preferred embodiment of the present invention is illustrated. In this specific example, the optical lens system satisfies the following specific conditional expressions:

$f/f1=1.39$ $f/f4=1.39$ $f/f5=-1.74$ $f/f4-f/f1=-0.01$ $f4/f5=-1.25$ $|f/f4|+|f/f5|=3.13$ $SL/TTL=0.93$ $TTL/ImgH=1.45$ $Yc1/ImgH=0.72$ $Yc2/ImgH=0.74$ $Yc52/Td=0.33$ $|V2-V3|=0.00$ $(V1-V2)=32.60$ $|R1/R2|=0.05$ $R4/R3=0.26$ $R10/R9=-0.08$ $(R9+R10)/(R9-R10)=0.86$ $R1/f=0.38$ $R10/f=0.33$ $f/R4=1.39$ $(R7-R8)/(R7+R8)=1.00$ $\alpha PE=7.10$ $e^{(VPE/V5)}=3.16$ $CTPE=0.11$ $(CT2+CT3)/(CT4+CT5)=0.55$ $(T12/f)*100=0.75.$ In addition, As shown in FIGS. 13 and 18-19, the aperture stop 70B, which is provided between an imaged object and the first lens 10B, has a spherical surface towards the imaged object, the first lens 10B has a first object side surface 101B which is an aspherical surface and a first image side surface 102B which is an aspherical surface, the second lens 20B has a second object side surface 201B which is an aspherical surface and a second image side surface 202B which is an aspherical surface, the third lens 30B has a third object side surface 301B which is an aspherical surface and a third image side surface 302B which is an aspherical surface, the fourth lens 40B has a fourth object side surface 401B which is an aspherical surface and a fourth image side surface 402B which is an aspherical surface, the fifth lens 50B has a fifth object side surface 501B which is an aspherical surface and a fifth image side surface 502B which is an aspherical surface, the flat element 60B, which can be an IR filter, has a flat element object side surface 601B and a flat element image side surface 602B, and the solid image pickup element 90B defines an image plane 901B. The optical data of the image pickup optical lens system according to the second example of the preferred embodiment of the present invention is shown in FIG. 18.

FIG. 19 illustrates the aspheric coefficients of the surfaces of the five lenses 10B-50B. FIGS. 14 to 17 illustrate longitudinal aberration curves, astigmatism curves, a distortion curve, and a lateral color curve of the image pickup optical lens system according to the second example of the preferred embodiment respectively.

Figure 20:
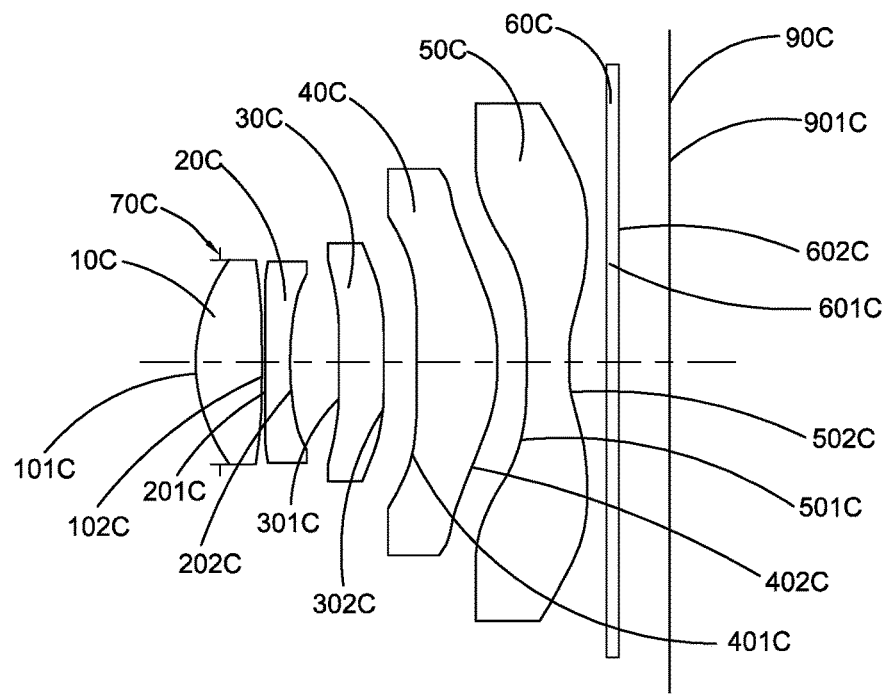
FIG. 20 is a schematic view of the image pickup optical lens system according to a third example of the preferred embodiment of the present invention.
Figure 21:
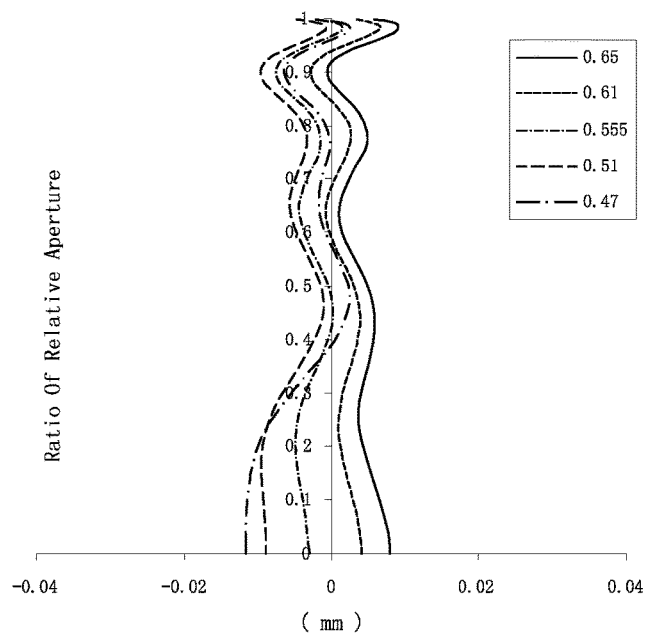
FIG. 21 illustrates longitudinal aberration curves of the image pickup optical lens system according to the third example of the preferred embodiment of the present invention.
Figure 22:
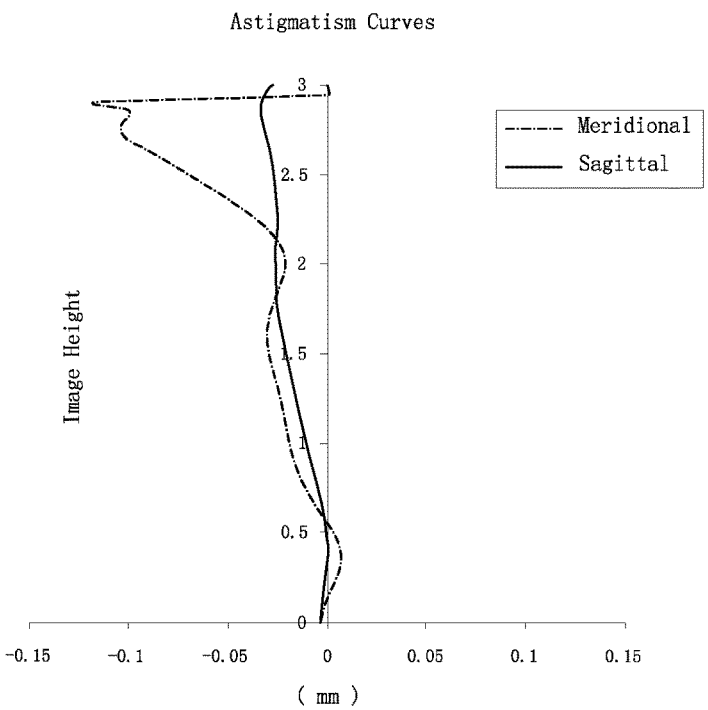
FIG. 22 illustrates astigmatism curves of the image pickup optical lens system according to the third example of the preferred embodiment of the present invention.
Figure 23:
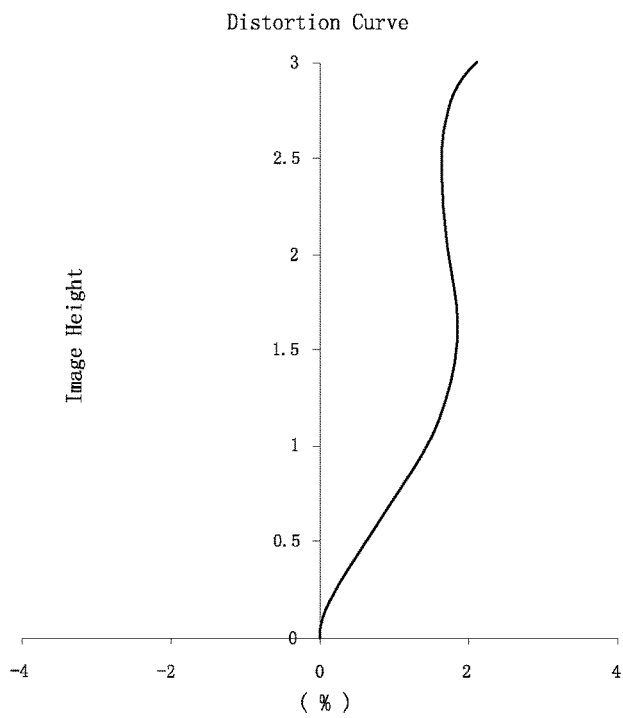
FIG. 23 illustrates a distortion curve of the image pickup optical lens system according to the third example of the preferred embodiment of the present invention.
Figures 26, 27:
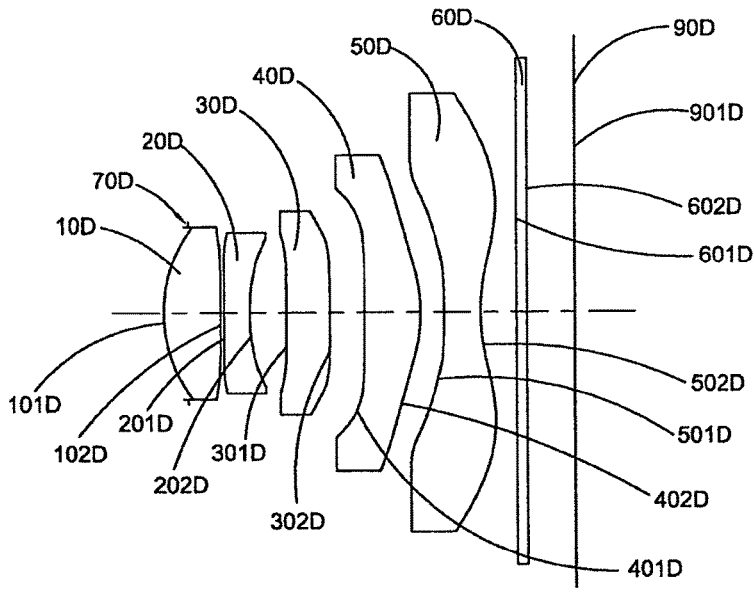
FIG. 26 is TABLE 6 which lists the aspheric coefficients of the image pickup optical lens system according to the third example of the preferred embodiment of the present invention.
FIG. 27 is a schematic view of the image pickup optical lens system according to a fourth example of the preferred embodiment of the present invention.
Figure 28:
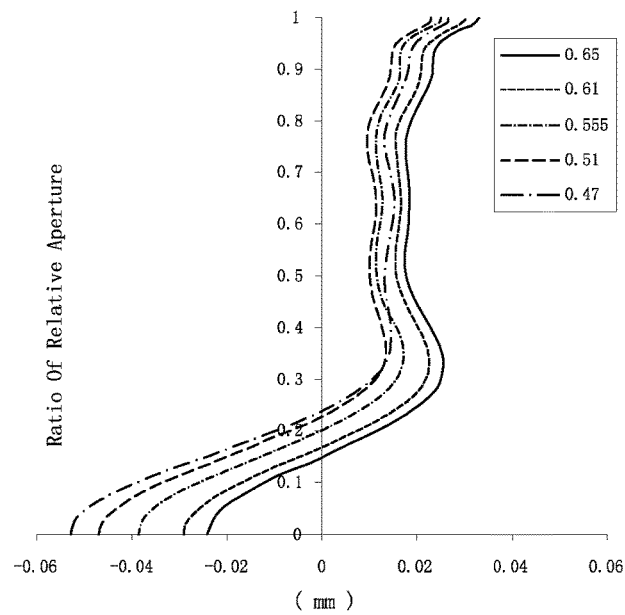
FIG. 28 illustrates longitudinal aberration curves of the image pickup optical lens system according to the fourth example of the preferred embodiment of the present invention.
Figure 29:
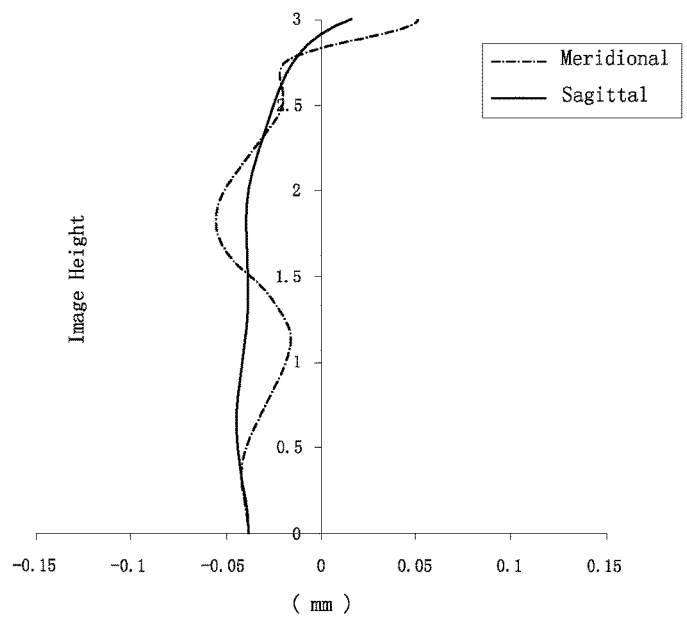
FIG. 29 illustrates astigmatism curves of the image pickup optical lens system according to the fourth example of the preferred embodiment of the present invention.
Figure 30:
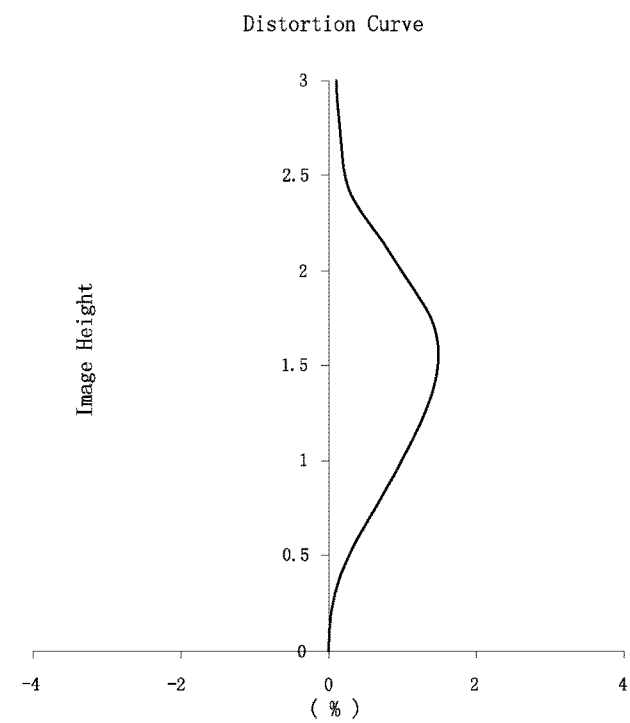
FIG. 30 illustrates a distortion curve of the image pickup optical lens system according to the fourth example of the preferred embodiment of the present invention.
Figure 31:
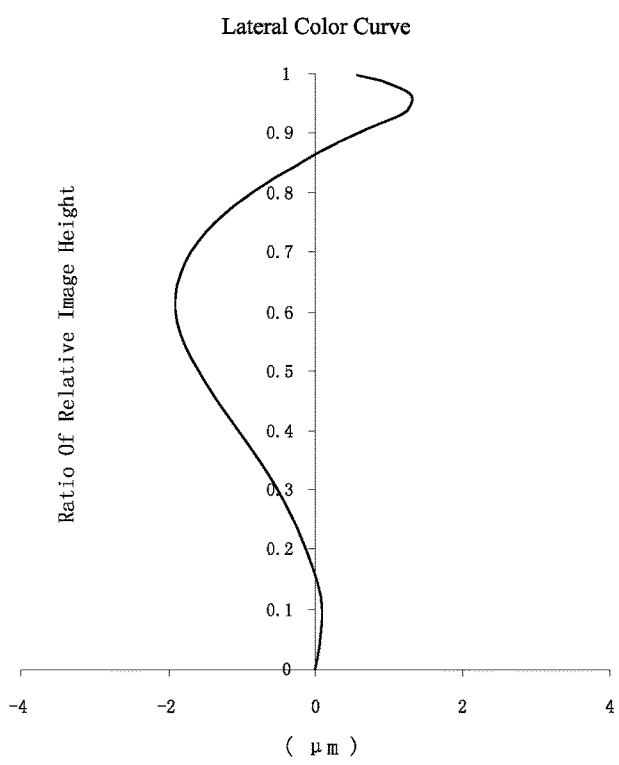
FIG. 31 illustrates a lateral color curve of the image pickup optical lens system according to the fourth example of the preferred embodiment of the present invention.

Referring to FIGS. 20-26 of the drawings, the optical lens system according to a third example of the preferred embodiment of the present invention is illustrated. In this specific example, the optical lens system satisfies the following specific conditional expressions:

$f/f1=1.35$ $f/f4=1.43$ $f/f5=-1.79$ $f/f4-f/f1=0.08$ $f4/f5=-1.25$ $|f/f4|+|f/f5|=3.21$ $SL/TTL=0.94$ $TTL/ImgH=1.47$ $Yc1/ImgH=0.69$ $Yc2/ImgH=0.72$ $Yc52/Td=0.34$ $|V2-V3|=32.60$ $(V1-V2)=32.60$ $|R1/R2|=0.00$ $R4/R3=0.27$ $R10/R9=-0.07$ $(R9+R10)/(R9-R10)=0.86$ $R1/f=0.40$ $R10/f=0.32$ $f/R4=1.52$ $(R7-R8)/(R7+R8)=1.00$ $\alpha PE=7.10$ $e^{(VPE/V5)}=3.16$ $CTPE=0.11$ $(CT2+CT3)/(CT4+CT5)=0.57$ $(T12/f)*100=0.67.$ In addition, As shown in FIGS. 20 and 25-26, the aperture stop 70C, which is provided between an imaged object and the first lens 10C, has a spherical surface towards the imaged object, the first lens 10C has a first object side surface 101C which is an aspherical surface and a first image side surface 102C which is an aspherical surface, the second lens 20C has a second object side surface 201C which is an aspherical surface and a second image side surface 202C which is an aspherical surface, the third lens 30C has a third object side surface 301C which is an aspherical surface and a third image side surface 302C which is an aspherical surface, the fourth lens 40C has a fourth object side surface 401C which is an aspherical surface and a fourth image side surface 402C which is an aspherical surface, the fifth lens 50C has a fifth object side surface 501C which is an aspherical surface and a fifth image side surface 502C which is an aspherical surface, the flat element 60C which can be an IR filter, has a flat element object side surface 601C and a flat element image side surface 602C, and the solid image pickup element 90C defines an image plane 901C. The detailed optical data of the image pickup optical lens system according to the third example of the preferred embodiment of the present invention is shown in FIG. 25.

FIG. 26 illustrates the aspheric coefficients of the surfaces of the five lenses 10C-50C. FIGS. 21 to 24 illustrate longitudinal aberration curves, astigmatism curves, a distortion curve, and a lateral color curve of the image pickup optical lens system according to the third example of the preferred embodiment respectively.

Referring to FIGS. 27-33 of the drawings, the optical lens system according to a fourth example of the preferred embodiment of the present invention is illustrated. In this specific example, the optical lens system satisfies the following specific conditional expressions:

$f/f1=1.21$ $f/f4=1.39$ $f/f5=-1.75$ $f/f4-f/f1=0.17$ $f4/f5=-1.26$ $|f/f4|+|f/f5|=3.14$ $SL/TTL=0.93$ $TTL/ImgH=1.48$ $Yc1/ImgH=0.69$ $Yc2/ImgH=0.72$ $Yc52/Td=0.34$ $|V2-V3|=32.60$ $(V1-V2)=32.60$ $|R1/R2|=0.12$ $R4/R3=0.45$ $R10/R9=-0.03$ $(R9+R10)/(R9-R10)=0.94$ $R1/f=0.40$ $R10/f=0.32$ $f/R4=1.84$ $(R7-R8)/(R7+R8)=1.00$ $\alpha PE=7.10$ $e^{(VPE/V5)}=3.16$ $CTPE=0.11$ $(CT2+CT3)/(CT4+CT5)=0.77$ $(T12/f)*100=0.93.$ In addition, As shown in FIGS. 27 and 32-33, the aperture stop 70D, which is provided between an imaged object and the first lens 10D, has a spherical surface towards the imaged object, the first lens 10D has a first object side surface 101D which is an aspherical surface and a first image side surface 102C which is an aspherical surface, the second lens 20D has a second object side surface 201D which is an aspherical surface and a second image side surface 202D which is an aspherical surface, the third lens 30D has a third object side surface 301D which is an aspherical surface and a third image side surface 302D which is an aspherical surface, the fourth lens 40D has a fourth object side surface 401D which is an aspherical surface and a fourth image side surface 402D which is an aspherical surface, the fifth lens 50D has a fifth object side surface 501D which is an aspherical surface and a fifth image side surface 502D which is an aspherical surface, the flat element 60D, which can be an IR filter, has a flat element object side surface 601D and a flat element image side surface 602D, and the solid image pickup element 90D defines an image plane 901D. The detailed optical data of the image pickup optical lens system according to the fourth example of the preferred embodiment of the present invention is shown in FIG. 32.

FIG. 33 illustrates the aspheric coefficients of the surfaces of the five lenses 10D-50D. FIGS. 28 to 31 illustrate longitudinal aberration curves, astigmatism curves, a distortion curve, and a lateral color curve of the image pickup optical lens system according to the fourth example of the preferred embodiment respectively.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An optical lens system for forming a subject image on a photoelectric conversion section of a solid image pickup element and an image pickup lens comprising, in order from an object side to an image side, a first lens, a second lens, a third lens, a fourth lens, and a fifth lens,
the first lens having a positive refractive power with a convex surface on an object side thereof;
the second lens having a negative refractive power with a concave surface on an image side thereof;
the third lens having a refractive power with an aspheric surface on an object side thereof and a convex surface on an image side thereof;
the fourth lens having a positive refractive power with a flat surface on an object side thereof and a convex surface on an image side thereof;
the fifth lens having a negative refractive power with aspheric surfaces on an object side and an image side thereof respectively, wherein the fifth lens has at least one inflection point formed at at least one of the aspheric surfaces of the object side and the image side;
wherein an aperture stop is disposed at the object side of the first lens, and at least one flat element is located between the fifth lens and an image plane; wherein the optical lens system satisfies the following conditional expressions:

$1.20 \le f/f1 \le 1.40$ $1.00 \le f/f4 \le 1.45$ $-1.80 \le f/f5 \le -1.45$ $-1.35 \le f4/f5 \le -1.25$ $-0.30 \le f/f4 - f/f1 \le 0.10$ $2.50 \le |f/f4| + |f/f5| \le 3.25$ $0.90 \le SL/TTL \le 0.95$ $1.25 \le TTL/ImgH \le 1.50$ $0.60 \le Yc1/ImgH \le 0.75$ $0.60 \le Yc2/ImgH \le 0.75$ $0.32 \le Yc52/Td \le 0.38$ $0 \le |V2-V3| \le 32.6$ $32.58 \le V1-V2 \le 35$ $0 \le |R1/R2| \le 0.15$ $-0.55 \le R4/R3 \le 0.45$ $-0.10 \le R10/R9 \le 0.30$ $0.85 \le (R9+R10)/(R9-R10) \le 1.85$ $0.35 \le R1/f \le 0.40$ $0.25 \le R10/f \le 0.35$ $0.60 \le f/R4 \le 1.85$ $0.8 \le (R7-R8)/(R7+R8) \le 1.0$ $\alpha PE = 7.1$ $3.13 \le e^{(VPE/V5)} \le 3.16$ $CTPE = 0.11$ $0.55 \le (CT2+CT3)/(CT4+CT5) \le 0.80$ $0.65 \le (T12/f)*100 \le 2.40$ where,
f denotes a focal length of the optical lens system,
f1 denotes a focal length of the first lens,
f4 denotes a focal length of fourth lens,
f5 denotes a focal length of the fifth lens,
TTL denotes a distance of an optical axis between the object side of the first lens and an image plane,
ImgH denotes a half of a diagonal length of an effective pixel area of an image sensor,
SL denotes a distance of the optical axis between the aperture stop and the image plane,
Yc1 denotes a vertical distance from the optical axis to the intersection point of the light and the image side of the fifth lens, when an incident angle of the light is 36° and the light passes through the center of the aperture stop,
Yc2 denotes a vertical distance from the optical axis to the intersection point of the light and the image side of the fifth lens, when the incident angle of the light is 37° and the light passes though the center of the aperture stop,
Yc52 denotes a distance between the optical axis and a non-axial critical point of the image side of the fifth lens,
Td denotes an axial distance between the object side of the first lens and the image side of the fifth lens,
V1 denotes the Abbe number of the first lens,
V2 denotes the Abbe number of the second lens,
V3 denotes the Abbe numbers of the third lens,
V5 denotes the Abbe number of the fifth lens,
R1 denotes a radius of a curvature of the object side of the first lens,
R2 denotes a radius of a curvature of the image side of the first lens,
R3 denotes a radius of a curvature of the object side of the second lens,
R4 denotes a radius of a curvature of the image side of the second lens,
R7 denotes a radius of a curvature of the object side of the fourth lens,
R8 denotes a radius of a curvature of the image side of the fourth lens,
R9 denotes a radius of a curvature of the object side of the fifth lens,
R10 denotes a radius of a curvature of the image side of the fifth lens, αPE denotes a linear expansion coefficient of the flat element at 20° C.,
VPE denotes a relationship between the Abbe number of the flat element,
CTPE denotes a central thickness of the flat element,
CT2 denotes a central thickness of the second lens,
CT3 denotes a central thickness of the third lens,
CT4 denotes a central thickness of the fourth lens, and
T12 denotes the on-axis spacing between the first lens and the second lens.

2. The optical lens system, as recited in claim 1, wherein the optical lens system further satisfies the following specific conditional expressions:

$f/f1=1.37$ $f/f4=1.08$ $f/f5=-1.46$ $f/f4-f/f1=-0.29$ $f4/f5=-1.35$ $|f/f4|+|f/f5|=2.53$ $SL/TTL=0.93$ $TTL/ImgH=1.29$ $Yc1/ImgH=0.62$ $Yc2/ImgH=0.64$ $Yc52/Td=0.37$ $|V2-V3|=2.01$ $(V1-V2)=34.58$ $|R1/R2|=0.09$ $R4/R3=-0.55$ $R10/R9=0.29$ $(R9+R10)/(R9-R10)=1.81$ $R1/f=0.37$ $R10/f=0.25$ $f/R4=0.60$ $(R7-R8)/(R7+R8)=1.00$ $\alpha PE=7.10$ $e^{(VPE/V5)}=3.16$ $CTPE=0.11$ $(CT2+CT3)/(CT4+CT5)=0.63$ $(T12/f)*100=2.38.$ 3. The optical lens system, as recited in claim 1, wherein the optical lens system further satisfies the following conditional expressions:

$f/f1=1.39$ $f/f4=1.39$ $f/f5=-1.74$ $f/f4-f/f1=-0.01$ $f4/f5=-1.25$ $|f/f4|+|f/f5|=3.13$ $SL/TTL=0.93$ $TTL/ImgH=1.45$ $Yc1/ImgH=0.72$ $Yc2/ImgH=0.74$ $Yc52/Td=0.33$ $|V2-V3|=0.00$ $(V1-V2)=32.60$ $|R1/R2|=0.05$ $R4/R3=0.26$ $R10/R9=-0.08$ $(R9+R10)/(R9-R10)=0.86$ $R1/f=0.38$ $R10/f=0.33$ $f/R4=1.39$ $(R7-R8)/(R7+R8)=1.00$ $\alpha PE=7.10$ $e^{(VPE/V5)}=3.16$ $CTPE=0.11$ $(CT2+CT3)/(CT4+CT5)=0.55$ $(T12/f)*100=0.75.$ 4. The optical lens system, as recited in claim 1, wherein the optical lens system further satisfies the following conditional expressions:

$f/f1=1.35$ $f/f4=1.43$ $f/f5=-1.79$ $f/f4-f/f1=0.08$ $f4/f5=-1.25$ $|f/f4|+|f/f5|=3.21$ $SL/TTL=0.94$ $TTL/ImgH=1.47$ $Yc1/ImgH=0.69$ $Yc2/ImgH=0.72$ $Yc52/Td=0.34$ $|V2-V3|=32.60$ $(V1-V2)=32.60$ $|R1/R2|=0.00$ $R4/R3=0.27$ $R10/R9=-0.07$ $(R9+R10)/(R9-R10)=0.86$ $R1/f=0.40$ $R10/f=0.32$ $f/R4=1.52$ $(R7-R8)/(R7+R8)=1.00$ $\alpha PE=7.10$ $e^{(VPE/V5)}=3.16$ $CTPE=0.11$ $(CT2+CT3)/(CT4+CT5)=0.57$ $(T12/f)*100=0.67$.

5. The optical lens system, as recited in claim 1, wherein the optical lens system further satisfies the following conditional expressions:

$f/f1=1.21$ $f/f4=1.39$ $f/f5=-1.75$ $f/f4-f/f1=0.17$ $f4/f5=-1.26$ $|f/f4|+|f/f5|=3.14$ $SL/TTL=0.93$ $TTL/ImgH=1.48$ $Yc1/ImgH=0.69$ $Yc2/ImgH=0.72$ $Yc52/Td=0.34$ $|V2-V3|=32.60$ $(V1-V2)=32.60$ $|R1/R2|=0.12$ $R4/R3=0.45$ $R10/R9=-0.03$ $(R9+R10)/(R9-R10)=0.94$ $R1/f=0.40$ $R10/f=0.32$ $f/R4=1.84$ $(R7-R8)/(R7+R8)=1.00$ $\alpha PE=7.10$ $e^{(VPE/V5)}=3.16$ $CTPE=0.11$ $(CT2+CT3)/(CT4+CT5)=0.77$ $(T12/f)*100=0.93$.

6. The optical lens system, as recited in claim 1, wherein the fifth lens is made of plastic material and the image side of the fifth lens has a concave surface.

7. The optical lens system, as recited in claim 1, wherein each of the object side and image side of the fifth lens comprises a central concave portion and a convex portion circumferentially and integrally extended from the concave portion, rendering a shape of the fifth lens gradually changed from an indention at a center to a protrusion at a circumferential edge at both of the object side and the image side thereof, so as to effectively reduce a light incident angle thereof.

8. The optical lens system, as recited in claim 1, wherein a surface of each of the five lenses have a substantial smooth curvature.

9. The optical lens system, as recited in claim 1, wherein air layers formed between each two adjacent lenses of the five lenses are substantially evenly arranged.

10. The optical lens system, as recited in claim 1, further comprising a lens barrel housing the five lenses, wherein a ring shaped separator is provided between every two adjacent lenses of the five lenses for providing a light sheltering and a cushioning function.

11. The optical lens system, as recited in claim 7, further comprising a lens barrel housing the five lenses, wherein a ring shaped separator is provided between every two adjacent lenses of the five lenses for providing a light sheltering and a cushioning function.

12. The optical lens system, as recited in claim 10, wherein each of the five lenses comprises a circumferential mounting end which comprises at least one of an upper mounting portion and a lower mounting portion, wherein each of the separators is laminated between the upper mounting portion and the lower mounting portion of the two adjacent lenses of the five lenses.

13. The optical lens system, as recited in claim 11, wherein each of the five lenses comprises a circumferential mounting end which comprises at least one of an upper mounting portion and a lower mounting portion, wherein each of the separators is laminated between the upper mounting portion and the lower mounting portion of the two adjacent lenses of the five lenses.

14. The optical lens system, as recited in claim 13, wherein each of the upper mounting portions and the lower mounting portions is embodied as a protrusion portion.

15. The optical lens system, as recited in claim 12, wherein at least a part of a lateral surface of the circumferential mounting end is spaced apart from an inner wall of the lens barrel to reduce a frictional contact area between the lateral surface of the circumferential mounting end and the inner wall of the lens barrel.

16. The optical lens system, as recited in claim 13, wherein at least a part of a lateral surface of the circumferential mounting end is spaced apart from an inner wall of the lens barrel to reduce a frictional contact area between the lateral surface of the circumferential mounting end and the inner wall of the lens barrel.

17. The optical lens system, as recited in claim 15, wherein the circumferential mounting end has a reduced and tapered thickness corresponding to the at least a part of the lateral surface of the circumferential mounting end which is spaced apart from the inner wall of the lens barrel to reduce the frictional contact area between the lateral surface of the circumferential mounting end and the inner wall of the lens barrel.

18. The optical lens system, as recited in claim 16, wherein the circumferential mounting end has a reduced and tapered thickness corresponding to the at least a part of the lateral surface of the circumferential mounting end which is spaced apart from the inner wall of the lens barrel to reduce the frictional contact area between the lateral surface of the circumferential mounting end and the inner wall of the lens barrel.

19. The optical lens system, as recited in claim 12, wherein each of the separators is stacked with the circumferential mounting end of the adjacent lens which is provided above the separator, defining an effective optical operation area of the adjacent lens.

20. The optical lens system, as recited in claim 13, wherein each of the separators is stacked with the circumferential mounting end of the adjacent lens which is provided above the separator, defining an effective optical operation area of the adjacent lens.

\* \* \* \* \*